United States Patent
Daniilidis et al.

(10) Patent No.: US 11,187,536 B2
(45) Date of Patent: Nov. 30, 2021

(54) PROBABILISTIC DATA ASSOCIATION FOR SIMULTANEOUS LOCALIZATION AND MAPPING

(71) Applicant: The Trustees of the University of Pennsylvania, Philadelphia, PA (US)

(72) Inventors: Konstantinos Daniilidis, Wynnewood, PA (US); George J. Pappas, Philadelphia, PA (US); Sean Laurence Bowman, Philadelphia, PA (US); Nikolay Asenov Atanasov, San Diego, CA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 218 days.

(21) Appl. No.: 16/247,243

(22) Filed: Jan. 14, 2019

(65) Prior Publication Data

US 2019/0219401 A1    Jul. 18, 2019

Related U.S. Application Data

(60) Provisional application No. 62/616,990, filed on Jan. 12, 2018.

(51) Int. Cl.
*G01C 21/16* (2006.01)
*G05D 1/02* (2020.01)
*G01C 21/18* (2006.01)
*G01C 21/20* (2006.01)
(Continued)

(52) U.S. Cl.
CPC .......... *G01C 21/165* (2013.01); *G01C 21/18* (2013.01); *G01C 21/206* (2013.01); *G05D 1/027* (2013.01); *G05D 1/0212* (2013.01); *G05D 1/0246* (2013.01); *G05D 1/0274* (2013.01); *G06K 9/00* (2013.01); *G06T 7/143* (2017.01)

(58) Field of Classification Search
None
See application file for complete search history.

(56) References Cited

FOREIGN PATENT DOCUMENTS

WO    WO-2015017691 A1 *    2/2015    ........... G05D 1/0274

OTHER PUBLICATIONS

Semantic Localization Via the Matrix Permanent, University of Pennsylvania (Year: 2014).*

(Continued)

*Primary Examiner* — Aniss Chad
*Assistant Examiner* — Elijah W. Vaughan
(74) *Attorney, Agent, or Firm* — Jenkins, Wilson, Taylor & Hunt, P.A.

(57) ABSTRACT

A method for simultaneous location and mapping (SLAM) includes receiving, by at least one processor, a set of sensor measurements from a movement sensor of a mobile robot and a set of images captured by a camera on the mobile robot as the mobile robot traverses an environment. The method includes, for each image of at least a subset of the set of images, extracting, by the at least one processor, a plurality of detected objects from the image. The method includes estimating, by the at least one processor, a trajectory of the mobile robot and a respective semantic label and position of each detected object within the environment using the sensor measurements and an expectation maximization (EM) algorithm.

9 Claims, 7 Drawing Sheets

(51) Int. Cl.
   *G06K 9/00* (2006.01)
   *G06T 7/143* (2017.01)

(56) References Cited

OTHER PUBLICATIONS

Localization from semantic observations via the matrix permanent, Nikolay Atanasov, Menglong Zhu, Kostas Daniilidis and George J. Pappas, IJRR (Year: 2016).*
SLAM++: Simultaneous Localisation and Mapping at the Object Level, Renato F. Salas-Moreno, (Year: 2013).*
Atanasov et al., "Localization from semantic observations via the matrix permanent," The International Journal of Robotics Research, vol. 35, No. 1-3, pp. 73-99 (2016).
Cai et al., "A Unified Multi-scale Deep Convolutional Neural Network for Fast Object Detection," European Conference on Computer Vision, pp. 1-16 (2016).
Mur-Artal et al., "ORB-SLAM2: an Open-Source SLAM System for Monocular, Stereo and RGB-D Cameras," CoRR, vol. abs/1610.06475, http://arxiv.org/abs/1610.06475, pp. 1-8 (2016).
Bloesch et al., "Robust Visual Inertial Odometry Using a Direct EFK-Based Approach," IEEE/RSJ Int. Conf. on Intelligent Robots and Systems, pp. 298-304 (2015).
Chen et al., "3D Object Proposals for Accurate Object Class Detection," NIPS, pp. 1-9 (2015).
Forster et al., "IMU Preintegration on Manifold for Efficient Visual-Inertial Maximum-a-Posteriori Estimation," Proceedings of Robotics: Science and Systems, pp. 1-10 (Jul. 2015).
Gálvez-López et al., "Real-time Monocular Object SLAM," arXiv:1504.02398, pp. 1-16 (2015).
Gidaris et al., "Object detection via a multi-region & semantic segmentation-aware CNN model," IEEE Int. Conf, on Computer Vision, pp. 1134-1142 (2015).
He et al., "Deep Residual Learning for Image Recognition," arXiv preprint arXiv:1512.03385, pp. 1-12 (2015).
Kostavelis et al., "Semantic mapping for mobile robotics tasks: A survey," Robotics and Autonomous Systems, vol. 66, pp. 86-103 (2015).
Mur-Artal et al., "ORB-SLAM: a Versatile and Accurate Monocular SLAM System," IEEE Transactions on Robotics, vol. 31, No. 5, pp. 1147-1163 (2015).
Pillai et al., "Monocular SLAM Supported Object Recognition," Proceedings of Robotics: Science and Systems (RSS), pp. 1-9 (Jul. 2015).
Ren et al., "Faster R-CNN: Towards real-time object detection with region proposal networks," Advances in Neural Information Processing Systems (NIPS), pp. 1-9 (2015).
Vineet et al., "Incremental Dense Semantic Stereo Fusion for Large-Scale Semantic Scene Reconstruction," IEEE International Conference on Robotics and Automation (ICRA), pp. 1-8 (2015).
Agrawal et al., "Analyzing the performance of multilayer neural networks for object recognition," Computer Vision-ECCV 2014, Springer, pp. 1-21 (2014).
Atanasov et al., "Semantic Localization Via the Matrix Permanent," Robotics: Science and Systems (RSS), pp. 1-10 (2014).
Forster et al., "SVO: Fast Semi-Direct Monocular Visual Odometry," IEEE Int. Conf. on Robotics and Automation, pp. 15-22 (2014).
Hesch et al., "Consistency Analysis and Improvement of Vision-aided Inertial Navigation," IEEE Trans. on Robotics (TRO), vol. 30, No. 1, pp. 158-176 (2014).
Kundu et al., "Joint Semantic Segmentation and 3D Reconstruction from Monocular Video," Computer Vision ECCV 2014, http://dx.doi.org/10.1007/978-3-319-10599-4, vol. 8694, pp. 703-718 (2014).
Liu et al., "Single-view 3d scene parsing by attributed grammar," IEEE Conference on Computer Vision and Pattern Recognition (CVPR), pp. 684-691 (2014).
Nikolic et al., "A Synchronized Visual-Inertial Sensor System with FPGA Pre-Processing for Accurate Real-Time SLAM," 2014 IEEE International Conference on Robotics and Automation, pp. 431-437 (2014).

Reid, "Towards Semantic Visual SLAM," Int. Conf. on Control Automation Robotics Vision (ICARCV), p. 1 (2014).
Zhu et al., "Active Deformable Part Models Inference," European Conference on Computer Vision, vol. 8695, pp. 281-296 (2014).
Dubout et al., "Deformable Part Models with Individual Part Scaling," British Machine Vision Conference, No. EPFL-CONF-192393, pp. 1-10 (2013).
Kottas et al., "Detecting and Dealing with Hovering Maneuvers in Vision-aided Inertial Navigation Systems," IEEE/RSJ International Conference on Intelligent Robots and Systems, pp. 3172-3179 (Nov. 2013).
Kottas et al., "Efficient and Consistent Visionaided Inertial Navigation using Line Observations," IEEE Int. Conf. on Robotics and Automation (ICRA), pp. 1540-1547 (2013).
Salas-Moreno et al., "SLAM++: Simultaneous Localisation and Mapping at the Level of Objects," IEEE Conf. on Computer Vision and Pattern Recognition (CVPR), pp. 1352-1359 (2013).
Stückler et al., "Dense Real-Time Mapping of Object-Class Semantics from RGB-D Video," Journal of Real-Time Image Processing, pp. 1-10 (2013).
Dellaert, "Factor Graphs and GTSAM: A Hands-on Introduction," GT RIM, Tech. Rep. GT-RIM-CP&R-2012-002, https://research.cc.gatech.edu/borg/sites/edu.borg/files/downloads/gtsam.pdf, pp. 1-27 (2012).
Geiger et al., "Are we ready for Autonomous Driving? The KITTI Vision Benchmark Suite," Conference on Computer Vision and Pattern Recognition (CVPR), pp. 1-8 (2012).
Henry et al., "RGB-D mapping: Using Kinect-style depth cameras for dense 3D modeling of indoor environments," The International Journal of Robotics Research (IJRR), vol. 31, No. 5, pp. 647-663 (2012).
Kaess et al., "iSAM2: Incremental Smoothing and Mapping Using the Bayes Tree," The International Journal of Robotics Research (IJRR), vol. 31, No. 2, pp. 216-235 (2012).
Bao et al., "Semantic Structure from Motion," IEEE Conf. on Computer Vision and Pattern Recognition (CVPR), pp. 2025-2032 (2011).
Civera et al., "Towards Semantic SLAM Using a Monocular Camera," IEEE/RSJ Int. Conf. on Intelligent Robots and Systems, pp. 1277-1284 (2011).
Geiger et al., "StereoScan: Dense 3d Reconstruction in Real-time," Intelligent Vehicles Symposium (IV), pp. 963-968 (2011).
Kümmerle et al., "g2o: A General Framework for Graph Optimization," IEEE International Conference on Robotics and Automation (ICRA), pp. 3607-3613 (2011).
Pronobis, "Semantic Mapping with Mobile Robots," Dissertation, KTH Royal Institute of Technology, 66 pages (2011).
Rublee et al., "ORB: An efficient alternative to sift or surf," Int. Conf. on Computer Vision, pp. 2564-2571 (2011).
Felzenszwalb et al., "Object Detection with Discriminatively Trained Part-Based Models," IEEE Trans. on Pattern Analysis and Machine Intelligence (PAMI), vol. 32, No. 9, pp. 1627-1645 (2010).
Law, "Approximately Counting Perfect and General Matchings in Bipartite and General Graphs," Ph.D. dissertation, Duke University, pp. 1-227 (2009).
Leibe et al., "Dynamic 3D Scene Analysis from a Moving Vehicle," IEEE Conf. on Computer Vision and Pattern Recognition (CVPR), pp. 1-8 (Jun. 2007).
Mourikis et al., "A Multi-State Constraint Kalman Filter for Vision-aided Inertial Navigation," 2007 IEEE International Conference on Robotics and Automation, pp. 3565-3572 (2007).
Durrant-Whyte et al., "Simultaneous Localization and Mapping: Part I," IEEE Robotics & Automation Magazine, vol. 13, No. 2, pp. 99-108 (Jun. 2006).
Vo et al., "The Gaussian Mixture Probability Hhypothesis Density Filter," IEEE Transactions on Signal Processing, vol. 54, No. 11, pp. 4091-4104 (Nov. 2006).
Galindo et al., "Multi-hierarchical Semantic Maps for Mobile Robotics," IEEE/RSJ Int. Conf. on Intelligent Robots and Systems (IROS-05), pp. 2278-2283 (2005).

(56) References Cited

OTHER PUBLICATIONS

Jerrum et al., "A Polynomial-Time Approximation Algorithm for the Permanent of a Matrix with Nonnegative Entries," J. ACM, vol. 51, No. 4, http://doi.acm.org/10.1145/1008731.1008738, pp. 671-697 (Jul. 2004).

Neira et al., "Data Association in Stochastic Mapping Using the Joint Compatibility Test," IEEE Trans. on Robotics and Automation, vol. 17, No. 6, pp. 890-897 (2001).

Lu et al., "Globally Consistent Range Scan Alignment for Environment Mapping," Auton. Robots, vol. 4, No. 4, pp. 1-31 (1997).

Munkres, "Algorithms for the Assignment and Transportation Problems," Journal of the Society for Industrial & Applied Mathematics, vol. 5, No. 1, pp. 32-38 (1957).

\* cited by examiner

| KITTI Sequence 05 | | |
|---|---|---|
| Method | Trans. err [%] | Rot. err [deg/m] |
| Ours | 1.31 | 0.0038 |
| VISO2 | 4.08 | 0.0050 |
| ORBSLAM2 Mono | 5.39 | 0.0019 |
| ORBSLAM2 Stereo | 0.63 | 0.0017 |

| KITTI Sequence 06 | | |
|---|---|---|
| Method | Trans. err [%] | Rot. err [deg/m] |
| Ours | 0.77 | 0.0037 |
| VISO2 | 1.81 | 0.0036 |
| ORBSLAM2 Mono | 6.71 | 0.0015 |
| ORBSLAM2 Stereo | 0.29 | 0.0013 |

FIG. 12

PROBABILISTIC DATA ASSOCIATION FOR SIMULTANEOUS LOCALIZATION AND MAPPING

PRIORITY CLAIM

This application claims the benefit of U.S. Provisional Patent Application Ser. No. 62/616,990, filed Jan. 12, 2018, the disclosure of which is incorporated herein by reference in its entirety.

GOVERNMENT INTEREST

This invention was made with government support under Grant Numbers ARL MAST-CTA W911NF-08-2-0004 and ARL RCTA W911NF-10-2-0016 awarded by the Army Research Lab. The government has certain rights in the invention.

TECHNICAL FIELD

This specification relates generally to mobile robots and computer systems for simultaneous localization and mapping.

BACKGROUND

Traditional approaches to simultaneous localization and mapping (SLAM) rely on low-level geometric features such as points, lines, and planes. They are unable to assign semantic labels to landmarks observed in the environment. Loop closure recognition based on low-level features is often viewpoint-dependent and subject to failure in ambiguous or repetitive environments. Object recognition methods can infer landmark classes and scales, resulting in a small set of easily recognizable landmarks, ideal for view-independent unambiguous loop closure. In a map with several objects of the same class, however, a crucial data association problem exists—an object observation needs to be associated to the correct object among several objects of the same class. While data association and recognition are discrete problems usually solved using discrete inference, classical SLAM is a continuous optimization over metric information.

SUMMARY

This specification formulates an optimization problem over sensor states and semantic landmark positions that integrates metric information, semantic information, and data associations, and decomposes it into two interconnected optimization problems: an estimation of discrete data association and landmark class probabilities, and a continuous optimization over the metric states (e.g., positions and orientations). The estimated landmark and robot poses affect the association and class distributions, which in turn affect the robot-landmark pose optimization. The performance of the algorithm is demonstrated on indoor and outdoor datasets of RGB camera images and accelerometer and gyroscope measurements.

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 12 shows two tables specifying KITTI mean translational and rotational error over path lengths (100, 200, . . . 800) meters.

DETAILED DESCRIPTION

This specification addresses the metric and semantic SLAM problems jointly, taking advantage of object recognition to tightly integrate both metric and semantic information into the sensor state and map estimation. In addition to providing a meaningful interpretation of the scene, semantically-labeled landmarks address two critical issues of geometric SLAM: data association (matching sensor observations to map landmarks) and loop closure (recognizing previously-visited locations). This specification provides the following:

an approach to tightly couple inertial, geometric, and semantic observations into a single optimization framework, a formal decomposition of the joint metric-semantic SLAM problem into continuous (pose) and discrete (data association and semantic label) optimization subproblems, experiments on several long-trajectory real indoor and outdoor datasets, which include odometry and visual measurements in cluttered scenes and varying lighting conditions.

This specification describes methods, systems, computer readable mediums, and mobile robots for semantic SLAM.

Figure 1:
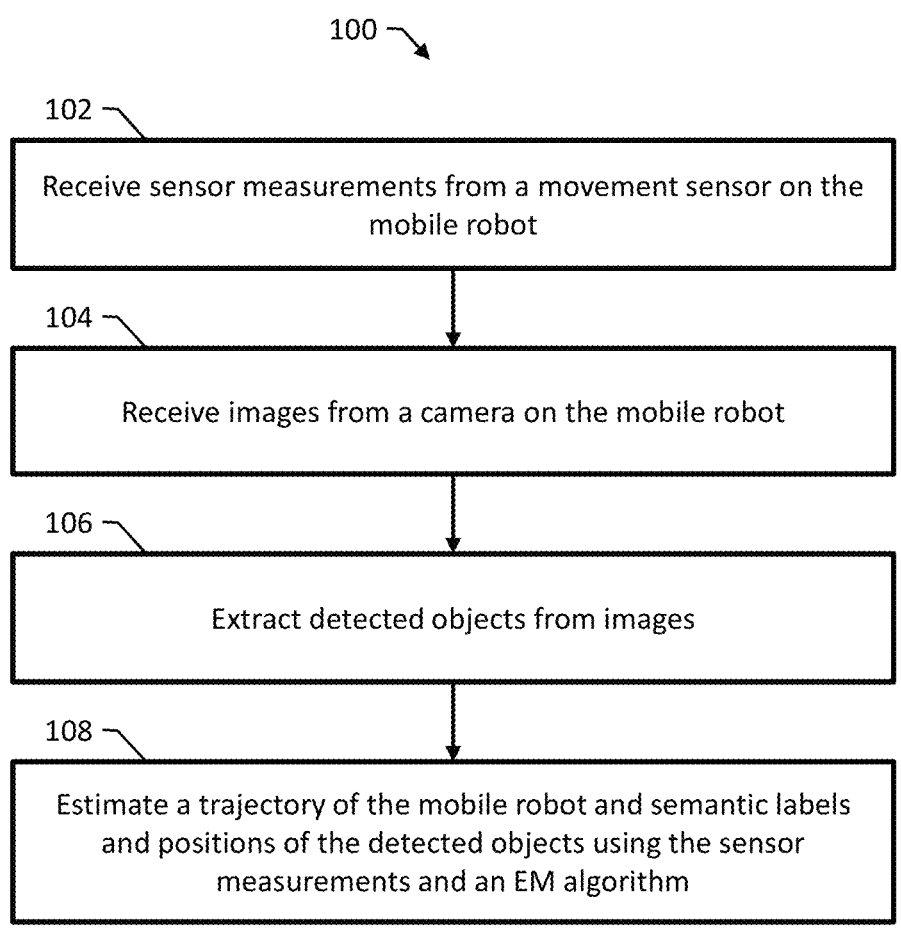
FIG. 1 is a flow diagram of an example method for semantic SLAM.

FIG. 1 is a flow diagram of an example method 100 for semantic SLAM. The method 100 can be performed by a computer system including at least one processor and memory storing instructions for the processor. For example, the method 100 can be performed by an on-board computer system of a mobile robot with a camera and a movement sensor or by a remote computer system remote from the mobile robot.

The method 100 includes receiving a set of sensor measurements from a movement sensor of a mobile robot (102). The method includes receiving a set of images captured by a camera on the mobile robot as the mobile robot traverses an environment (104). For example, receiving the set of sensor measurements from the movement sensor can include receiving accelerometer and gyroscope measurements from an inertial measurement unit of the mobile robot, and receiving the set of sensor measurements and the set of images can include time synchronizing the sensor measurements and the images.

The method 100 includes, for each image of at least a subset of the set of images, extracting detected objects from the image (106). The method 100 includes estimating a trajectory of the mobile robot and a respective semantic label and position of each detected object within the environment using the sensor measurements and an expectation maximization (EM) algorithm (108). An example of semantic SLAM using an EM algorithm is described further below.

For example, using the EM algorithm can include iteratively solving for a data association distribution for a plurality of data associations between the detected objects and the semantic labels and positions of the detected objects, e.g., using a matrix permanent algorithm, in an expectation step of the EM algorithm. Using the EM algorithm can include iteratively solving for respective mobile robot positions and semantic labels and positions of detected objects using the data association distribution in a maximization step of the EM algorithm. Using the EM algorithm can include iterating between the expectation step and the maximization step until an end condition is reached.

Estimating the trajectory of the mobile robot and the semantic label and position of each detected object can include, for each image of the subset of the set of images, extracting geometric point features. The method 100 can include tracking the geometric point features across the set of images.

Estimating the trajectory of the mobile robot and the semantic label and position of each detected object can include constructing a pose graph including vertices for mobile robot poses and vertices for detected object positions. Estimating the trajectory of the mobile robot and the semantic label and position of each detected object can include determining soft data associations between mobile robot poses and detected object positions using, for each soft data association, a number of different factors, e.g., semantic factors, geometric factors, and movement sensor factors.

Further examples of semantic SLAM are provided below. Observed objects in the environment are generally in one of two categories: (1) objects already present in our constructed map that are re-observed, or (2) objects that have been previously unseen and must be added to our estimated map. The examples in the first section below describe handling objects in class (1) in a probabilistic EM way, and the examples in the second section below include a method to include both categories (1) and (2) probabilistically.

Probabilistic Data Association for Semantic SLAM—Section I

The following section describes a study performed regarding semantic SLAM. The study illustrates examples of semantic SLAM.

Traditional approaches to simultaneous localization and mapping (SLAM) rely on low-level geometric features such as points, lines, and planes. They are unable to assign semantic labels to landmarks observed in the environment. Furthermore, loop closure recognition based on low-level features is often viewpoint-dependent and subject to failure in ambiguous or repetitive environments. On the other hand, object recognition methods can infer landmark classes and scales, resulting in a small set of easily recognizable landmarks, ideal for view-independent unambiguous loop closure. In a map with several objects of the same class, however, a crucial data association problem exists. While data association and recognition are discrete problems usually solved using discrete inference, classical SLAM is a continuous optimization over metric information. In this paper, we formulate an optimization problem over sensor states and semantic landmark positions that integrates metric information, semantic information, and data associations, and decompose it into two interconnected problems: an estimation of discrete data association and landmark class probabilities, and a continuous optimization over the metric states. The estimated landmark and robot poses affect the association and class distributions, which in turn affect the robot-landmark pose optimization. The performance of our algorithm is demonstrated on indoor and outdoor datasets.

I. Introduction

In robotics, simultaneous localization and mapping (SLAM) is the problem of mapping an unknown environment while estimating a robot's pose within it. Reliable navigation, object manipulation, autonomous surveillance, and many other tasks require accurate knowledge of the robot's pose and the surrounding environment. Traditional approaches to SLAM rely on low-level geometric features such as corners [1], lines [2], and surface patches [3] to reconstruct the metric 3-D structure of a scene but are mostly unable to infer semantic content. On the other hand, recent methods for object recognition [4]-[6] can be combined with approximate 3D reconstruction of the environmental layout from single frames using priors [7], [8]. These are rather qualitative single 3D snapshots rather than the more precise mapping we need for a robot to navigate. The goal of this paper is to address the metric and semantic SLAM problems jointly, taking advantage of object recognition to tightly integrate both metric and semantic information into the sensor state and map estimation. In addition to providing a meaningful interpretation of the scene, semantically-labeled landmarks address two critical issues of geometric SLAM: data association (matching sensor observations to map landmarks) and loop closure (recognizing previously-visited locations).

Approaches to SLAM were initially most often based on filtering methods in which only the most recent robot pose is estimated [9]. This approach is in general very computationally efficient, however because of the inability to estimate past poses and relinearize previous measurement functions, errors can compound [1]. More recently, batch methods that optimize over entire trajectories have gained popularity. Successful batch methods typically represent optimization variables as a set of nodes in a graph (a "pose graph"). Two robot-pose nodes share an edge if an odometry measurement is available between them, while a landmark and a robot-pose node share an edge if the landmark was observed from the corresponding robot pose. This pose graph optimization formulation of SLAM traces back to Lu and Milios [10]. In recent years, the state of the art [11], [12] consists of iterative optimization methods (e.g., nonlinear least squares via the Gauss-Newton algorithm) that achieve excellent performance but depend heavily on linearization of the sensing and motion models. This becomes a problem when we consider including discrete observations, such as detected object classes, in the sensing model.

One of the first systems that used both spatial and semantic representations was proposed by Galindo et al. [13]. A spatial hierarchy contained camera images, local metric maps, and the environment topology, while a semantic hierarchy represented concepts and relations, which allowed room categories to be inferred based on object detections. Many other approaches [14]-[19] extract both metric and semantic information but typically the two processes are carried out separately and the results are merged afterwards. The lack of integration between the metric and the semantic mapping does not allow the object detection confidence to influence the performance of the metric optimization. Focusing on the localization problem only, Atanasov et al. [20] incorporated semantic observations in the metric optimization via a set-based Bayes filter. The works that are closest to ours [21]-[24] consider both localization and mapping and carry out metric and semantic mapping jointly. SLAM++ [22] focuses on a realtime implementation of joint 3-D object recognition and RGBD SLAM via pose graph optimization. A global optimization for 3D reconstruction and semantic parsing has been proposed by [25], which is the closest work in semantic/geometric joint optimization. The main difference is that 3D space is voxelized and landmarks and/or semantic labels are assigned to voxels which are connected in a conditional random field while our approach allows the estimation of continuous pose of objects. Bao et al. [21] incorporate camera parameters, object geometry, and object classes into a structure from motion problem, resulting in a detailed and accurate but large and expensive optimization. A recent comprehensive survey of semantic mapping can be found in [26].

Most related work uses a somewhat arbitrary decomposition between data association, pose graph optimization, and object recognition. Our work makes the following contributions to the state of the art:
- our approach is the first to tightly couple inertial, geometric, and semantic observations into a single optimization framework,
- we provide a formal decomposition of the joint metricsemantic SLAM problem into continuous (pose) and discrete (data association and semantic label) optimization sub-problems,
- we carry out experiments on several long-trajectory real indoor and outdoor datasets, which include odometry and visual measurements in cluttered scenes and varying lighting conditions.

II. Probabilistic Data Association in SLAM

Consider the classical localization and mapping problem, in which a mobile sensor moves through an unknown environment, modeled as a collection $\mathcal{L} \triangleq \{\ell_m\}_{m=1}^M$ of M static landmarks. Given a set of sensor measurements $\mathcal{Z} \triangleq \{z_k\}_{k=1}^K$, the task is to estimate the landmark positions $\mathcal{L}$ and a sequence of poses $X \triangleq \{x_t\}_{t=1}^T$ representing the sensor trajectory. Most existing work focuses on estimating $X$ and $\mathcal{L}$ and rarely emphasizes that the data association $\mathcal{D} \triangleq \{(\alpha_k, \beta_k)\}_{k=1}^K$ stipulating that measurement $z_k$ of landmark $\ell_{\beta_k}$ was obtained from sensor state $x_{\alpha_k}$ is in fact unknown. A complete statement of the SLAM problem involves maximum likelihood estimation of X, $\mathcal{L}$, and $\mathcal{D}$ given the measurements $\mathcal{Z}$:

$$\hat{X}, \hat{\mathcal{L}}, \hat{\mathcal{D}} = \arg\max_{X,\mathcal{L},\mathcal{D}} \log p(\mathcal{Z} | X, \mathcal{L}, \mathcal{D}) \quad (1)$$

The most common approach to this maximization has been to decompose it into two separate estimation problems. First, given prior estimates $X^0$ and $\mathcal{L}^0$, the maximum likelihood estimate $\hat{\mathcal{D}}$ of the data association $\mathcal{D}$ is computed (e.g., via joint compatibility branch and bound [27] or the Hungarian algorithm [28]). Then, given $\hat{\mathcal{D}}$, the most likely landmark and sensor states are estimated:

$$\hat{\mathcal{D}} = \arg\max_{\mathcal{D}} p(\mathcal{D} | X^0, \mathcal{L}^0, \mathcal{Z}) \quad (2a)$$

$$\hat{X}, \hat{\mathcal{L}} = \arg\max_{X,\mathcal{L}} \log p(\mathcal{Z} | X, \mathcal{L}, \hat{\mathcal{D}}) \quad (2b)$$

The second optimization above is typically carried out via filtering [30]-[32] or pose-graph optimization [11], [12].

The above process has the disadvantage that an incorrectly chosen data association may have a highly detrimental effect on the estimation performance. Moreover, if ambiguous measurements are discarded to avoid incorrect association choices, they will never be reconsidered later when refined estimates of the sensor pose (and hence their data association) are available. Instead of a simple one step process, then, it is possible to perform coordinate descent, which iterates the two maximization steps as follows:

$$\mathcal{D}^{i+1} = \arg\max_{\mathcal{D}} p(\mathcal{D} | X^i, \mathcal{L}^i, \mathcal{Z}) \quad (3a)$$

$$X^{i+1}, \mathcal{L}^{i+1} = \arg\max_{X,\mathcal{L}} \log p(\mathcal{Z} | X, \mathcal{L}, \mathcal{D}^{i+1}) \quad (3b)$$

This resolves the problem of being able to revisit association decisions once state estimates improve but does little to resolve the problem with ambiguous measurements since a hard decision on data associations is still required. To address this, rather than simply selecting $\hat{\mathcal{D}}$ as the mode of $p(\mathcal{D} | X, \mathcal{Z}, \mathcal{L})$, we should consider the entire density of $\mathcal{D}$ when estimating X and $\mathcal{L}$. Given initial estimates Xi, Li, an improved estimate that utilizes the whole density of $\mathcal{D}$ can be computed by maximizing the expected measurement likelihood via expectation maximization (EM):

$$X^{i+1}, \mathcal{L}^{i+1} = \arg\max_{X,\mathcal{L}} \mathbb{E}_{\mathcal{D}}[\log p(\mathcal{Z} | X, \mathcal{L}, \mathcal{D}) | X^i, \mathcal{L}^i, \mathcal{Z}] \quad (4)$$

$$= \arg\max_{X,\mathcal{L}} \sum_{\mathcal{D} \in \mathbb{D}} p(\mathcal{D} | X^i, \mathcal{L}^i, \mathcal{Z}) \log p(\mathcal{Z} | X, \mathcal{L}, \mathcal{D})$$

where $\mathbb{D}$ is the space of all possible values of $\mathcal{D}$. This EM formulation has the advantage that no hard decisions on data association are required since it "averages" over all possible associations. To compare this with the coordinate descent formulation in (3), we can rewrite (4) as follows:

$$\arg\max_{X,\mathcal{L}} \sum_{\mathcal{D} \in \mathbb{D}} \sum_{k=1}^{K} p(\mathcal{D}|X^i, \mathcal{L}^i, \mathcal{Z}) \log p(z_k | x_{\alpha_k}, \ell_{\beta_k}) = \quad (5)$$

$$\arg\max_{X,\mathcal{L}} \sum_{k=1}^{K} \sum_{j=1}^{M} w_{kj}^i \log p(z_k | x_{\alpha_k}, \ell_j)$$

where $w_{kj}^i \triangleq \Sigma \mathcal{D} \in \mathbb{D}_{(k,j)} p(\mathcal{D}|X^i, \mathcal{L}^i, \mathcal{Z})$ is a weight, independent of the optimization variables X and $\mathcal{L}$, that quantifies the influence of the "soft" data association, and $\mathbb{D}(k,j) \triangleq \{\mathcal{D} \in \mathbb{D} | \beta_k = j\} \subseteq \mathbb{D}$ is the set of all data associations such that measurement k is assigned to landmark j. Note that the coordinate descent optimization (3b) has a similar form to (5), except that for each k there is exactly one j such that $w_{kj}^i = 1$ and $w_{kl}^i = 0$ for all $l \ne j$.

We can also show that the EM formulation, besides being a generalization of coordinate descent, is equivalent to the following matrix permanent maximization problem.

Proposition 1.

If $p(\mathcal{D}|X^i, \mathcal{L}^i)$ is uniform, the maximizers of the EM formulation in (4) and the optimization below are equal:

$$X^{i+1}, \mathcal{L}^{i+1} = \arg\max_{X,\mathcal{L}} \text{per}(Q^i(X, \mathcal{L})),$$

where per denotes the matrix permanent[2], $Q^i(X, \mathcal{L})$ is a matrix with elements $[Q^i]_{kj} := p(z_k|x_j^i, \ell_j^i) p(z_k|x_j, \ell_j)$ and $\{(x_j^i, \ell_j^i)\}$ and $\{(x_j, \ell_j)\}$ are enumerations of the sets $X^i \times \mathcal{L}^i$ and $X \times \mathcal{L}$, respectively.

Proof. See Appendix I.

Similar to the coordinate descent formulation, the EM formulation (5) allows us to solve the permanent maximization problem iteratively. First, instead of estimating a maximum likelihood data association, we estimate the data association distribution $p(\mathcal{D}|X^i, \mathcal{L}^i, \mathcal{Z})$ in the form of the weights $w_{kj}^i$ (the "E" step). Then, we maximize the expected measurement log likelihood over the previously computed distribution (the "M" step).

III. Semantic SLAM

In the rest of the paper, we focus on a particular formulation of the SLAM problem that in addition to sensor and landmark poses involves landmark classes (e.g., door, chair, table) and semantic measurements in the form of object detections. We will demonstrate that the expectation maximization formulation (5) is an effective way to solve the semantic SLAM problem.

Figure 2:
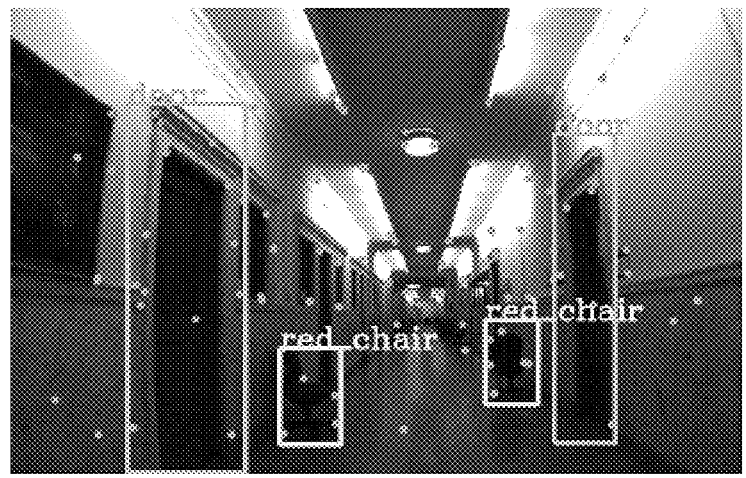
FIG. 2 shows an example keyframe image overlaid with ORB features and object detections.

Let the state $\ell$ of each landmark consist of its position $\ell^p \in \mathbb{R}^3$ as well as a class label $\ell^c$ from a discrete set $\mathcal{C} = \{1, \ldots, C\}$. To estimate the landmark states $\mathcal{L}$ and sensor trajectory X, we utilize three sources of information: inertial, geometric point features, and semantic object observations. Examples of geometric features and semantic observations can be seen in FIG. 2.

A. Inertial Information

We assume that the sensor package consists of an inertial measurement unit (IMU) and one monocular camera. A subset of the images captured by the camera are chosen as keyframes (e.g., by selecting every nth frame as a keyframe). The sensor state corresponding to the tth keyframe is denoted $x_t$ and consists of the sensor 6-D pose, velocity, and IMU bias values. We assume that the IMU and camera are time synchronized, so between keyframes t and t+1, the sensor also collects a set $\mathcal{I}_t$ of IMU measurements (linear acceleration and rotational velocity).

B. Geometric Information

In addition to the inertial measurements $\mathcal{I}_t$, we utilize geometric point measurements (e.g., Harris corners, SIFT, SURF, FAST, BRISK, ORB, etc.) $\mathcal{Y}_t$. From each keyframe image, these geometric point features are extracted and tracked forward to the subsequent keyframe. In our experiments we extract ORB features [33] from each keyframe and match them to the subsequent keyframe by minimizing the ORB descriptor distance. Since these features are matched by an external method, we assume that their data association is known.

C. Semantic Information

The last type of measurement used are object detections $S_t$ extracted from every keyframe image. An object detection $s_k = (s_k^c, s_k^s, s_k^b) \in S_t$ extracted from keyframe t consists of a detected class $s_k^c \in \mathcal{C}$, a score $s_k^s$ quantifying the detection confidence, and a bounding box $s_k^b$. Such information can be obtained from any modern approach for object recognition such as [5], [34]-[36]. In our implementation, we use a deformable parts model (DPM) detector [4], [37], [38], which runs on a CPU in real time. If the data association $\mathcal{D}_k = (\alpha_k, \beta_k)$ of measurement $s_k$ is known, the measurement likelihood can be decomposed as follows: $p(s_k|x_{\alpha_k}, \ell_{\beta_k}) = p(s_k^c|\ell_{\beta_k}^c) p(s_k^s|\ell_{\beta_k}^c, s_k^c) p(s_k^b|x_{\alpha_k}, \ell_{\beta_k}^p)$. The density $p(s_k^c|\ell_{\beta_k}^c)$ corresponds to the confusion matrix of the object detector and is learned offline along with the score distribution $p(s_k^s|\ell_{\beta_k}^c, s_k^c)$. The bounding-box likelihood $p(s_k^b|x_{\alpha_k}, \ell_{\beta_k}^p)$ is assumed normally distributed with mean equal to the perspective projection of the centroid of the object onto the image plane and covariance proportional to the dimensions of the detected bounding box.

Problem (Semantic SLAM). Given inertial $\mathcal{I} \triangleq \{\mathcal{I}_t\}_{t=1}^T$, geometric $\mathcal{Y} \triangleq \{\mathcal{Y}_t\}_{t=1}^T$, and semantic $S \triangleq \{S_t\}_{t=1}^T$ measurements, estimate the sensor state trajectory X and the positions and classes $\mathcal{L}$ of the objects in the environment. The inertial and geometric measurements are used to track the sensor trajectory locally and, similar to a visual odometry approach, the geometric structure is not recovered. The semantic measurements, in contrast, are used to construct a map of objects that can be used to perform loop closure that is robust to ambiguities and viewpoint and is more efficient than a SLAM approach that maintains full geometric structure.

IV. Semantic SLAM Using EM

Following the observations from Sec. II, we apply expectation maximization to robustly handle the semantic data association. In addition to treating data association as a latent variable, we also treat the discrete landmark class labels as latent variables in the optimization, resulting in a clean and efficient separation between discrete and continuous variables. As mentioned in Sec. III, the data association of the geometric measurements is provided by the feature tracking algorithm, so the latent variables we use are the data association $\mathcal{D}$ of the semantic measurements and the object classes $\ell_{1:M}^c$. The following proposition specifies the EM steps necessary to solve the semantic SLAM problem. The initial guess $X^{(0)}$ is provided by odometry integration; the initial guess $\mathcal{L}^{(0)}$ can be obtained from $X^{(0)}$ by initializing a landmark along the detected camera ray.

Proposition 2. If $p(\mathcal{D}|X, \mathcal{L})$ is uniform and the semantic measurement data associations are independent across keyframes, i.e., $p(\mathcal{D}|S, X, \mathcal{L}) = \Pi_{t=1}^T p(\mathcal{D}_t|S_t, X, \mathcal{L})$, the semantic SLAM problem can be solved via the expectation maximization algorithm by iteratively solving for (1) data association weights $w_{ij}^t$ (the "E" step) and (2) continuous sensor states x and landmark positions $l_{1:M}^p$ (the "M" step) via the following equations:

$$w_{kj}^{t,(i)} = \sum_{\ell^c \in C} \sum_{\mathcal{D}_t \in \mathbb{D}_t(k,j)} \kappa^{(i)}(\mathcal{D}_t, \ell^c) \forall t, k, j \quad (6)$$

$$\mathcal{X}^{(i+1)}, \ell_{1:M}^{p,(i+1)} = \arg\min_{\mathcal{X}, \ell_{1:M}^p} \sum_{t=1}^{T} \sum_{s_k \in S_t} \sum_{j=1}^{M} -w_{kj}^{t,(i)} \log p(s_k | x_t, \ell_j) \quad (7)$$

$\mathbb{D}_t$ is the set of all possible data associations for measurements received at timestep t, and $\mathbb{D}_t(i,j) \subseteq \mathbb{D}_t$ is the set of all possible data associations for measurements received at time t such that measurement i is assigned to landmark j.
Proof. See Appendix II.

A. Object Classes and Data Association (E Step)

The computation of the weights for a single keyframe require several combinatorial sums over all possible data associations. However, due to the assumption of independent associations among keyframes and the fact that only few objects are present within the sensor field-of-view, it is feasible to compute the summations and hence $w_{kj}^t$ for all keyframes t, measurements k, and landmarks j extremely efficiently in practice. Once the weights $w_{kj}^{t,(i)}$ are computed for each measurement-landmark pair, they are used within the continuous optimization over sensor states and landmark positions. Additionally, maximum likelihood landmark class estimates $\ell^c$ can be recovered from the computed k values:

$$\hat{\ell}_{1:M}^c = \arg\max_{\ell^c} p(\ell_{1:M}^c | \theta, \mathcal{Z}) = \arg\max_{\ell^c} \prod_{t=1}^{T} \sum_{\mathcal{D}_t \in \mathbb{D}_t} \kappa(\mathcal{D}_t, \ell^c)$$

B. Pose Graph Optimization (M Step)

Equation (7) forms the basis of our pose graph optimization over sensor states and landmark positions. A pose graph is a convenient way of representing an optimization problem for which there exists a clear physical structure or a sparse constraint set. The graph consists of a set of vertices v, each of which corresponds to an optimization variable, and a set of factors $\mathcal{F}$ among the vertices that correspond to individual components of the cost function. Graphically, a factor is a generalization of an edge that allows connectivity between more than two vertices. A factor f in the graph is associated with a cost function that depends on a subset of the variables v such that the entire optimization is of the form $$\hat{\mathcal{V}} = \arg\min_{\mathcal{V}} \sum_{f \in \mathcal{F}} f(\mathcal{V}) \quad (8)$$

In addition to providing a useful representation, factor graphs are advantageous in that there exist computational tools that allow efficient optimization [11], [39]. Our graph has a vertex for each sensor state $x_t$ and for each landmark position $\ell_i^p$. Contrary to most prior work in which a hard data association decision results in a measurement defining a single factor between a sensor pose and a landmark, we consider soft semantic data association multiple factors.

1) Semantic Factors: A measurement $s_k$ from sensor state $x_t$ defines factors $f_{kj}^s(x_t, \ell_j)$ for each visible landmark j. Assuming the number of visible landmarks and the number of received measurements are approximately equal, with this method the number of semantic factors in the graph is roughly squared. Note that since $\ell^c$ is fixed in (7), $p(s^s|\ell^c, s^c)$ and $p(s^c|\ell^c)$ are constant. Thus, log $p(s|x, \ell)$=log $p(s^b|x, \ell^p)$+log $p(s^s|\ell^c, s^c)p(s^c|\ell^c)$ and so the latter term can be dropped from the optimization.

Let $h_\pi(x, \ell^p)$ be the standard perspective projection of a landmark $\ell^p$ onto a camera at pose x. We assume that the camera measurement of a landmark $\ell^p$ from camera pose x is Gaussian distributed with mean $h_\pi(x, \ell^p)$ and covariance $R_s$. Thus, a camera factor corresponding to sensor state t, measurement k, and landmark j, $f_{kj}^s$, becomes $$f_{kj}^s(\mathcal{X}, \mathcal{L}) = -w_{kj}^{t,(i)} \log p(s_k^b | x_t, \ell_j^p) \quad (9)$$

$$= \|s_k^b - h_\pi(x_t, \ell_j)\|_{R_s/w_{kj}^{t,(i)}}^2 \quad (10)$$

Those semantic factors due to the re-observation of a previously seen landmark are our method's source of loop closure constraints.

2) Geometric Factors: Following [30], [40], we incorporate geometric measurements into the pose graph as structureless constraints between the camera poses that observed them. We can rewrite the term corresponding to geometric factors in (7) as $$-\log p(\mathcal{Y} | \mathcal{X}) = -\sum_{i=1}^{N_y} \sum_{k: \beta_k^y = i} \log p\left(y_k | x_{\alpha_k^y}\right) \quad (11)$$

where $N_y$ is the total number of distinct feature tracks, i.e. the total number of observed physical geometric landmarks.

Letting $\rho_{\beta_k^y}$ be the 3D position in the global frame of the landmark that generated measurement $y_k$, and assuming as before that the projection has Gaussian pixel noise with covariance $R_y$, we have $$-\log p(\mathcal{Y} | \mathcal{X}) = -\sum_{i=1}^{N_y} \sum_{k: \beta_k^y = i} \left\| y_k - h_\pi\left(x_{\alpha_k^y}, \rho_i\right) \right\|_{R_y}^2 \quad (12)$$

For a single observed landmark $\rho_i$, the factor constraining the camera poses which observed it takes the form $$f_i^y(\mathcal{X}) = \sum_{k: \beta_k^y = i} \left\| y_k - h_\pi\left(x_{\alpha_k^y}, \rho_i\right) \right\|_{R_y}^2 \quad (13)$$

Because we use iterative methods to optimize the full pose graph, it is necessary to linearize the above cost term.

The linearization of the above results in a cost term of the form $$\sum_{k:\beta_k^y=i} \left\| H_{ik}^\rho \delta\rho_i + H_{ik}^x \delta x_{\alpha_k^y} + b_{ik} \right\|^2 \quad (14)$$

where $H_{ik}^\rho$ is the Jacobian of the cost function with respect to $\rho_{\beta_k^y}$, $H_{ik}^x$ is the Jacobian with respect to $x_{\alpha_k^y}$, $b_{ik}$ is a function of the measurement and its error, and the linearized cost term is in terms of deltas $\delta x$, $\delta\rho$ rather than the true values $x$, $\rho$.

Writing the inner summation in one matrix form by stacking the individual components, we can write this simply as $\|H_i^\rho \delta\rho_i + H_i^x \delta x_{\alpha^y(i)} + b_i\|^2$. To avoid optimizing over $\rho$ values, and hence to remove the dependence of the cost function upon them, we project the cost into the null space of its Jacobian. We premultiply each cost term by $A_i$, a matrix whose columns span the left nullspace of $H_i^\rho$. The cost term for the structureless geometric features thus becomes a function of only the states which observe it:

$$\|A_i H_i^x \delta x_{\alpha^y(i)} + A_i b_i\|^2 \quad (15)$$

3) *Inertial Factors:* To incorporate the accelerometer and gyroscope measurements into the pose graph, we use the method of preintegration factors detailed in [40]. The authors provide an efficient method of computing inertial residuals between two keyframes $x_i$ and $x_j$ in which several inertial measurements were received. By "preintegrating" all IMU measurements received between the two keyframes, the relative pose difference (i.e. difference in position, velocity, and orientation) between the two successive keyframes is estimated. Using this estimated relative pose, the authors provide expressions for inertial residuals on the rotation ($r_{\Delta R_{ij}}$), velocity ($r_{\Delta v_{ij}}$), and position ($r_{\Delta p_{ij}}$) differences between two keyframes as a function of the poses $x_i$ and $x_j$. Specifically, they provide said expressions along with their noise covariances $\Sigma$ such that $$f_i^I(X) = -\log p(I_{ij} \mid X) \quad (16)$$

$$= \|r_{I_{ij}}\|_{\Sigma_{ij}}^2 \quad (17)$$

The full pose graph optimization corresponding to equation (7) is then a nonlinear least squares problem involving semantic observation terms (see (10)), geometric observation terms (see (15)), and inertial terms (see (17)).

$$\hat{x}_{1:T}, \hat{\ell}_{1:M} = \arg\min_{\mathcal{X}, \ell_{1:M}} \sum_{k=1}^{K} \sum_{j=1}^{M} f_{kj}^S(X, \ell_{1:M}^p) + \sum_{i=1}^{N_y} f_i^y(X) + \sum_{t=1}^{T-1} f_t^I(X) \quad (18)$$

We solve this within the iSAM2 framework [12], which is able to provide a near-optimal solution with real-time performance.

V. Experiments

We implemented our algorithm in C++ using GTSAM [39] and its iSAM2 implementation as the optimization back-end. All experiments were able to be computed in real-time.

The front-end in our implementation simply selects every 15th camera frame as a keyframe. As mentioned in section IIIB, the tracking front-end extracts ORB features [33] from every selected keyframe and tracks them forward through the images by matching the ORB descriptors. Outlier tracks are eliminated by estimating the essential matrix between the two views using RANSAC and removing those features which do not fit the estimated model. We assume that the timeframe between two subsequent images is short enough that the orientation difference between the two frames can be estimated accurately by integrating the gyroscope measurements. Thus, only the unit translation vector between the two images needs to be estimated. We can then estimate the essential matrix using only two point correspondences [41].

The front-end's object detector is an implementation of the deformable parts model detection algorithm [38]. On the acquisition of the semantic measurements from a new keyframe, the Mahalanobis distance from the measurement to all known landmarks is computed. If all such distances are above a certain threshold, a new landmark is initialized in the map, with initial position estimate along the camera ray, with depth given by the median depth of all geometric feature measurements within its detected bounding box (or some fixed value if no such features were tracked successfully).

While ideally we would iterate between solving for constraint weights $w_{ij}$ and poses as proposition 2 suggests, in practice for computational reasons we solve for the weights just once per keyframe.

Our experimental platform was a VI-Sensor [42] from which we used the IMU and left camera. We performed three separate experiments. The first consists of a medium length (approx. 175 meters) trajectory around one floor of an office building, in which the object classes detected and kept in the map were two types of chairs (red office chairs and brown four-legged chairs). The second experiment is a long (approx. 625 meters) trajectory around two different floors of an office building. The classes in the second experiment are red office chairs and doors. The third and final trajectory is several loops around a room equipped with a vicon motion tracking system, in which the only class of objects detected is red office chairs. In addition to our own experiments, we applied our algorithm to the KITTI dataset [43] odometry sequences 05 and 06.

Figure 4:
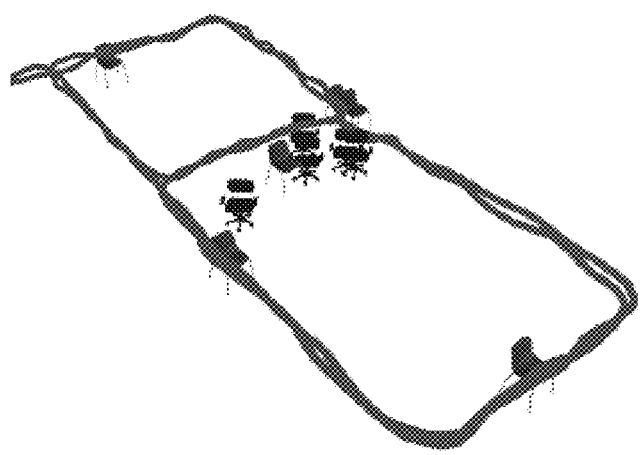
FIG. 4 shows a sensor trajectory and estimated landmarks for the first office experiment.
Figure 5:
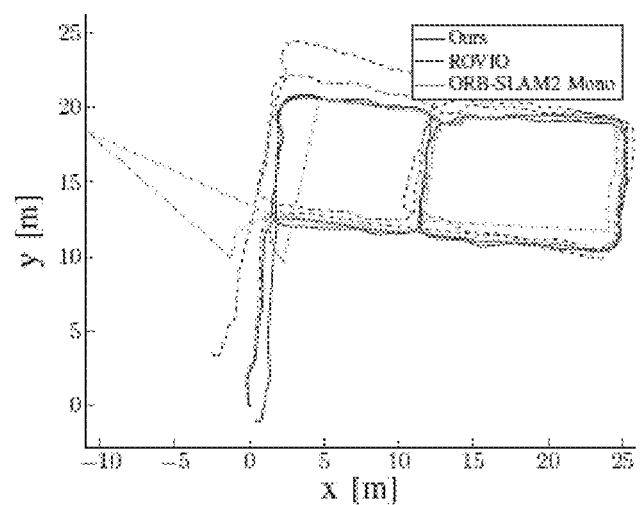
FIG. 5 shows estimated trajectories in the first office experiment.

The final trajectory estimate along with the estimated semantic map for the first office experiment is shown in FIG. 4. The trajectories estimated by our algorithm, by the ROVIO visual-inertial odometry algorithm [31], and by the ORB-SLAM2 visual SLAM algorithm [44], [45], projected into the x-y plane, are shown in FIG. 5. Due to a lack of inertial information and a relative lack of visual features in the environment, ORB-SLAM2 frequently got lost and much of the trajectory estimate is missing, but was always able to recover when entering a previously mapped region.

Figure 3:
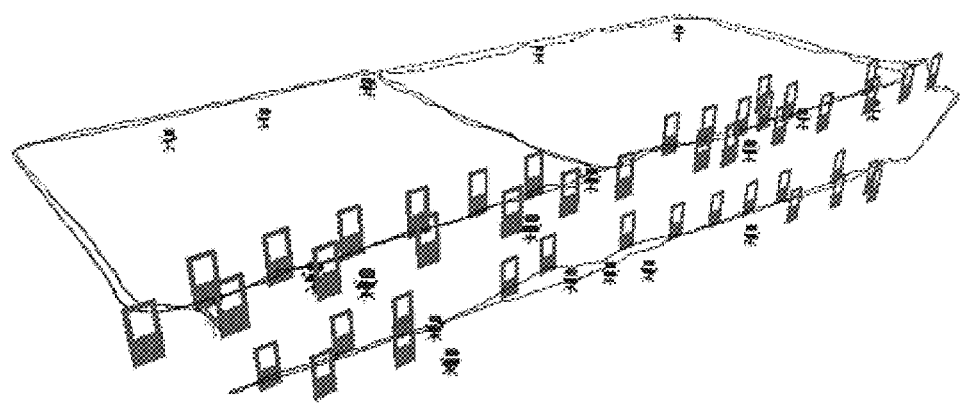
FIG. 3 shows an estimated sensor trajectory and landmark positions and classes using inertial, geometric, and semantic measurements.
Figure 6:
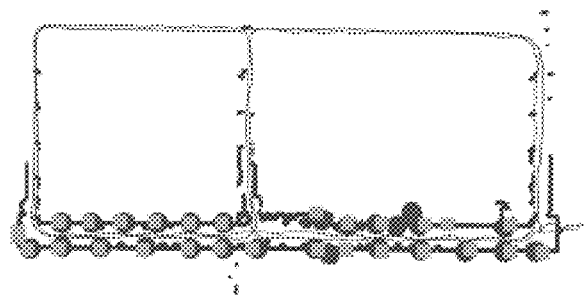
FIG. 6 shows an estimated trajectory in the second office experiment from our algorithm along with our estimated door landmark positions, overlaid onto a partial ground truth map along with ground truth door locations.
Figure 7:
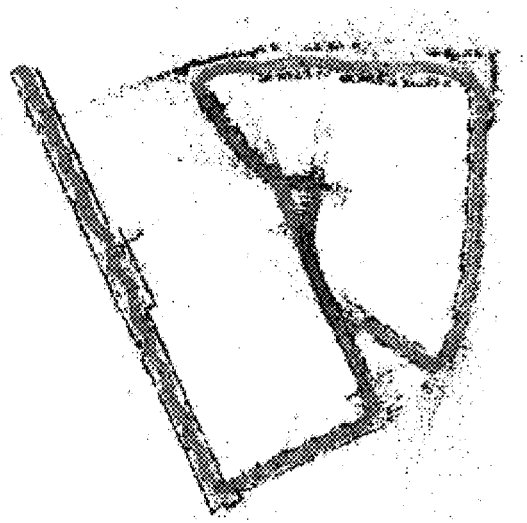
FIG. 7 shows a partial ORB-SLAM2 trajectory after incorrect loop closure in second office experiment.

The second office experiment trajectory along with the estimated map is shown in FIG. 3. An example image overlaid with object detections from near the beginning of this trajectory is displayed in FIG. 2. We constructed a partial map of the top floor in the experiment using a ground robot equipped with a lidar scanner. On this ground truth map, we manually picked out door locations. The portion of the estimated trajectory on the top floor is overlayed onto this partial truth map (the two were manually aligned) in FIG. 6. Due to the extremely repetitive nature of the hallways in this experiment, bag-of-words based loop closure detections are subject to false positives and incorrect matches. ORBSLAM2 was unable to successfully estimate the trajectory due to such false loop closures. A partial trajectory estimate after an incorrect loop closure detection is shown in FIG. 7.

Figure 8:
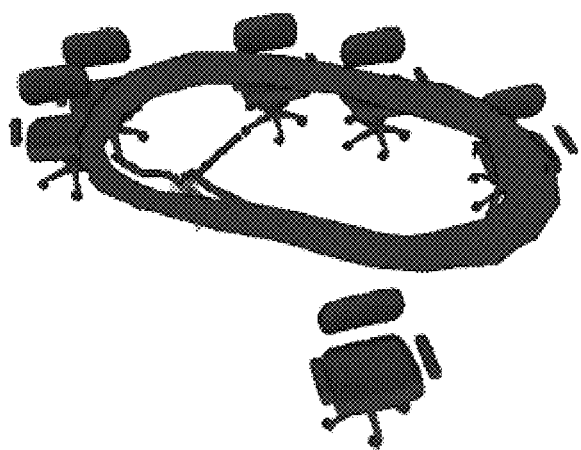
FIG. 8 shows a sensor trajectory and estimated landmarks for the vicon experiment.
Figure 9:
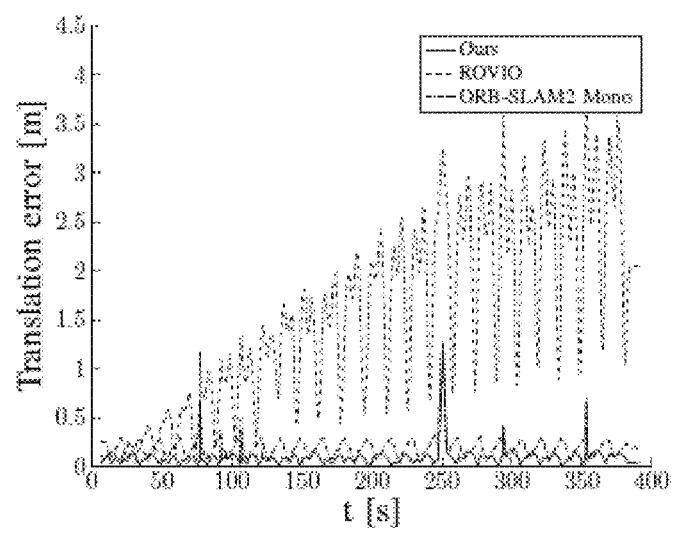
FIG. 9 shows position errors with respect to vicon ground truth.

The vicon trajectory and the estimated map of chairs is shown in FIG. 8. We evaluated the position error with respect to the vicon's estimate for our algorithm, ROVIO, and ORBSLAM2 and the results are shown in FIG. 9. Note that the spikes in the estimate errors are due to momentary occlusion from the vicon cameras.

Figure 10:
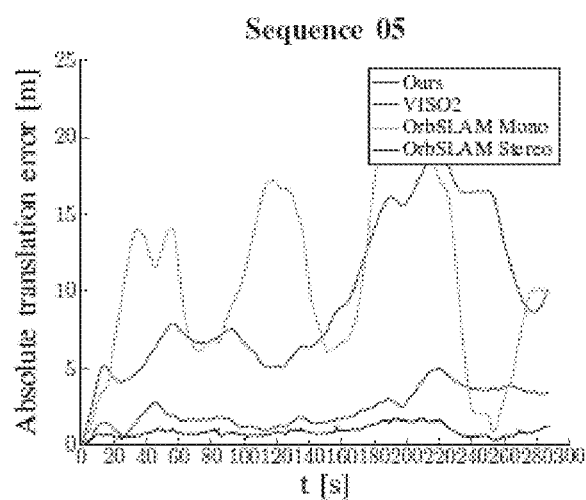
FIG. 10 is a chart of the norm of position error between estimate and ground truth, KITTI seq. 05.
Figure 11:
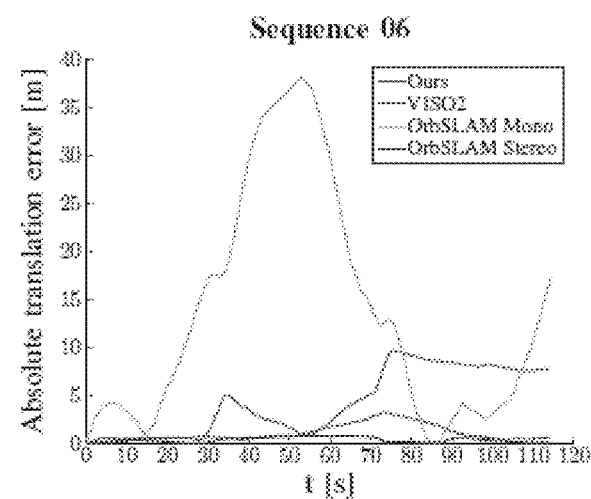
FIG. 11 is a chart of the norm of position error between estimate and ground truth, KITTI seq. 06.

We also evaluated our algorithm on the KITTI outdoor dataset, using odometry sequences 05 and 06. The semantic objects detected and used in our algorithm were cars. Rather than use inertial odometry in this experiment, we used the VISO2 [46] visual odometry algorithm as the initial guess $X^{(0)}$ for a new keyframe state. Similarly, we replaced the preintegrated inertial relative pose (cf. Sec. IV-B.3) with the relative pose obtained from VISO in the odometry factors. The absolute position errors over time for KITTI sequence 05 with respect to ground truth for our algorithm, VISO2, and ORB-SLAM2 with monocular and stereo cameras are shown in FIG. 10. The same for sequence 06 are shown in FIG. 11. Finally, the mean translational and rotational errors over all possible subpaths of length (100, 200, . . . , 800) meters are shown in FIG. 12.

VI. Conclusion

The experiments demonstrated that in complex and cluttered real-world datasets our method can be used to reconstruct the full 6-D pose history of the sensor and the positions and classes of the objects contained in the environment. The advantage of our work is that by having semantic features directly into the optimization, we include a relatively sparse and easily distinguishable set of features that allows for improved localization performance and loop closure, while only slightly impacting the computational cost of the algorithm. Furthermore, semantic information about the environment is valuable in and of itself in aiding autonomous operation of robots within a human-centric environment.

In future work, we plan to expand our algorithm to estimate the full pose of the semantic objects (i.e., orientation in addition to position). We also plan to fully exploit our EM decomposition by reconsidering data associations for past keyframes, and to consider systems with multiple sensors and non-stationary objects.

Appendix I: Proof of Proposition 1

First, we rewrite the optimization in (4) without a logarithm and similarly expand the expectation:

$$\mathcal{X}^{i+1}, \mathcal{L}^{i+1} = \arg\max_{\mathcal{X},\mathcal{L}} \sum_{\mathcal{D}\in\mathbb{D}} p(\mathcal{D}|\mathcal{X}^i, \mathcal{L}^i, \mathcal{Z}) p(\mathcal{Z}|\mathcal{X}, \mathcal{L}, \mathcal{D})$$

The data association likelihood can then be rewrite as $$p(\mathcal{D}|\mathcal{X}^i, \mathcal{L}^i, \mathcal{Z}) = \frac{p(\mathcal{Z}|\mathcal{X}^i, \mathcal{L}^i, \mathcal{D})p(\mathcal{D}|\mathcal{X}^i, \mathcal{L}^i)}{\sum_{\mathcal{D}} p(\mathcal{Z}|\mathcal{X}^i, \mathcal{L}^i, \mathcal{D})p(\mathcal{D}|\mathcal{X}^i, \mathcal{L}^i)} \quad (19)$$

$$= \frac{p(\mathcal{Z}|\mathcal{X}^i, \mathcal{L}^i, \mathcal{D})}{\sum_{\mathcal{D}} p(\mathcal{Z}|\mathcal{X}^i, \mathcal{L}^i, \mathcal{D})} \quad (20)$$

with the last equality due to the assumption that $p(\mathcal{D}|X, \mathcal{L})$ is uniform. We can next decompose the measurement likelihood $p(\mathcal{Z}|X, \mathcal{L}, \mathcal{D}) = \Pi_k p(z_k|x_{\alpha_k}, \ell_{\beta_k})$, and so $$\mathcal{X}^{i+1}, \mathcal{L}^{i+1} = \arg\max_{\mathcal{X},\mathcal{L}} \sum_{\mathcal{D}\in\mathbb{D}} p(\mathcal{D}|\mathcal{X}^i, \mathcal{L}^i, \mathcal{Z}) p(\mathcal{Z}|\mathcal{X}, \mathcal{L}, D) = \quad (21)$$

$$\arg\max_{\mathcal{X},\mathcal{L}} \sum_{\mathcal{D}\in\mathbb{D}} \prod_k \frac{p(z_k|x_{\alpha_k}^i, \ell_{\beta_k}^i)p(z_k|x_{\alpha_k}, \ell_{\beta_k})}{\sum_{\mathcal{D}} p(\mathcal{Z}|\mathcal{X}^i, \mathcal{L}^i, \mathcal{D})}$$

The result then follows by noting that the normalizing denominator is independent of the optimization variables and from the definition of the matrix permanent.

Appendix II: Proof of Proposition 2

Suppose we have some initial guess given by $\theta^{(i)} = \{X^{(i)}, \ell^{p,(i)}\}$. We can then compute an improved estimate of $\theta = \{X, \ell^p\}$ by maximizing the expected log likelihood:

$$\theta^{(i+1)} = \arg\max_\theta \mathbb{E}_{\mathcal{D},\ell^c|\theta^{(i)}}[\log p(\mathcal{D}, \ell^c, \mathcal{S}, \mathcal{Y}, \mathcal{I}|\theta)] \quad (22)$$

Expanding the expectation, $$\mathbb{E}_{\mathcal{D},\ell^c|\theta^{(i)}}[\log p(\mathcal{D}, \ell^c, \mathcal{S}, \mathcal{Y}, \mathcal{I}|\theta)] = \quad (23)$$

$$\sum_{\mathcal{D},\ell^c} p(\mathcal{D}, \ell^c|\mathcal{S}, \theta^{(i)}) \log[p(\mathcal{S}, \mathcal{D}, \ell^c|\theta) p(\mathcal{Y}|\theta) p(\mathcal{I}|\theta)]$$

Letting $\kappa(\mathcal{D}, \ell^c) \triangleq p(\mathcal{D}, \ell^c|\mathcal{S}, \theta^{(i)})$, a constant with respect to the optimization variables, we continue:

$$\mathbb{E}[\cdot] = \quad (24)$$

$$\sum_{\mathcal{D},\ell^c} \kappa(\mathcal{D}, \ell^c) \log p(\mathcal{S}, \mathcal{D}, \ell^c|\theta) + \sum_{\mathcal{D},\ell^c} \kappa(\mathcal{D}, \ell^c) \log[p(\mathcal{Y}|\theta) p(\mathcal{I}|\theta)] =$$

$$\sum_{\mathcal{D},\ell^c} \kappa(\mathcal{D}, \ell^c) \log p(\mathcal{S}, \mathcal{D}, \ell^c|\theta) + \log p(\mathcal{Y}|\theta) + \log p(\mathcal{I}|\theta)$$

Focusing on the leftmost summation over data associations and landmark classes, $$\sum_{\mathcal{D},\ell^c} \kappa(\mathcal{D}, \ell^c) \log p(\mathcal{S}, \mathcal{D}, \ell^c|\theta) = \quad (25)$$

$$\sum_{\mathcal{D},\ell^c} \kappa(\mathcal{D}, \ell^c) \log p(\mathcal{S}|\mathcal{D}, \ell^c, \theta) + \sum_{\mathcal{D},\ell^c} \kappa(\mathcal{D}, \ell^c) \log p(\mathcal{D}, \ell^c|\theta)$$

Using the assumption that $p(\mathcal{D}, \ell^c|\theta)$ is a uniform distribution over the space of data associations and landmark classes, this term doesn't affect which $\theta$ maximizes the objective, so for optimization purposes we have $$\sum_{\mathcal{D},\ell^c} \kappa(\mathcal{D}, \ell^c) \log p(\mathcal{S}, \mathcal{D}, \ell^c|\theta) = \sum_{\mathcal{D},\ell^c} \kappa(\mathcal{D}, \ell^c) \log p(\mathcal{S}|\mathcal{D}, \ell^c|\theta) \quad (26)$$

$$= \sum_t \sum_i \sum_{\mathcal{D}_t, \ell^c} \quad (27)$$

$$\kappa(\mathcal{D}_t, \ell^c) \log p(s_i|x_t, \ell_{\beta_i})$$

Note that if we let $\mathbb{D}(i, j)$ be the subset of all possible data associations that assign measurement i to landmark j, we can further decompose this summation as $$\sum_{\mathcal{D},\ell^c} \kappa(\mathcal{D},\ell^c)\log p(\mathcal{S},\mathcal{D},\ell^c\mid\theta) = \qquad(28)$$

$$\sum_t \sum_i \sum_j \sum_{\ell^c} \sum_{\mathcal{D}_t \in \mathbb{D}(i,j)} \kappa(\mathcal{D}_t,\ell^c)\log p(s_i\mid x_t,\ell_j)$$

Finally, letting $$w_{ij}^t \triangleq \sum_{\ell^c} \sum_{\mathcal{D}_t \in \mathbb{D}(i,j)} \kappa(\mathcal{D}_t,\ell^c)$$

we can write the final expectation maximization as $$\theta^{(i+1)} = \qquad(29)$$
$$\arg\max_\theta \sum_t \sum_i \sum_j w_{ij}^t \log p(s_i\mid x_t,\ell_j) + \log p(\mathcal{Y}\mid\theta) + \log p(\mathcal{I}\mid\theta)$$

REFERENCES

Each of the following references is hereby incorporated by reference in its entirety.

[1] J. A. Hesch, D. G. Kottas, S. L. Bowman, and S. I. Roumeliotis, "Consistency Analysis and Improvement of Vision-aided Inertial Navigation," *IEEE Trans. on Robotics (TRO)*, vol. 30, no. 1, pp. 158-176, 2014.

[2] D. G. Kottas and S. I. Roumeliotis, "Efficient and Consistent Visionaided Inertial Navigation using Line Observations," in *IEEE Int. Conf. on Robotics and Automation (ICRA)*, 2013, pp. 1540-1547.

[3] P. Henry, M. Krainin, E. Herbst, X. Ren, and D. Fox, "RGB-D mapping: Using Kinect-style depth cameras for dense 3D modeling of indoor environments," *The International Journal of Robotics Research (IJRR)*, vol. 31, no. 5, pp. 647-663, 2012.

[4] P. Felzenszwalb, R. Girshick, D. McAllester, and D. Ramanan, "Object Detection with Discriminatively Trained Part-Based Models," *IEEE Trans. on Pattern Analysis and Machine Intelligence (PAMI)*, vol. 32, no. 9, pp. 1627-1645, 2010.

[5] S. Ren, K. He, R. Girshick, and J. Sun, "Faster R-CNN: Towards real-time object detection with region proposal networks," in *Advances in Neural Information Processing Systems (NIPS)*, 2015.

[6] P. Agrawal, R. Girshick, and J. Malik, "Analyzing the performance of multilayer neural networks for object recognition," in *Computer Vision—ECCV 2014*. Springer, 2014, pp. 329-344.

[7] X. Liu, Y. Zhao, and S.-C. Zhu, "Single-view 3d scene parsing by attributed grammar," in *Computer Vision and Pattern Recognition (CVPR), 2014 IEEE Conference on*. IEEE, 2014, pp. 684-691.

[8] X. Chen, K. Kundu, Y. Zhu, A. Berneshawi, H. Ma, S. Fidler, and R. Urtasun, "3d object proposals for accurate object class detection," in *NIPS*, 2015.

[9] H. Durrant-Whyte and T. Bailey, "Simultaneous localization and mapping: part i," *Robotics Automation Magazine, IEEE*, vol. 13, no. 2, pp. 99-110, June 2006.

[10] F. Lu and E. Milios, "Globally Consistent Range Scan Alignment for Environment Mapping," *Auton. Robots*, vol. 4, no. 4, pp. 333-349, 1997.

[11] R. Kümmerle, G. Grisetti, H. Strasdat, K. Konolige, and W. Burgard, "g2o: A General Framework for Graph Optimization," in *IEEE Int. Conf. on Robotics and Automation (ICRA)*, 2011, pp. 3607-3613.

[12] M. Kaess, H. Johannsson, R. Roberts, V. Ila, J. Leonard, and F. Dellaert, "iSAM2: Incremental Smoothing and Mapping Using the Bayes Tree," *The International Journal of Robotics Research (IJRR)*, vol. 31, no. 2, pp. 216-235, 2012.

[13] C. Galindo, A. Saffiotti, S. Coradeschi, P. Buschka, J. Fernandez-Madrigal, and J. Gonzalez, "Multi-hierarchical Semantic Maps for Mobile Robotics," in *IEEE/RSJ Int. Conf. on Intelligent Robots and Systems (IROS)*, 2005, pp. 2278-2283.

[14] J. Civera, D. Galvez-Lopez, L. Riazuelo, J. Tardos, and J. Montiel, "Towards Semantic SLAM Using a Monocular Camera," in *IEEE/RSJ Int. Conf. on Intelligent Robots and Systems*, 2011, pp. 1277-1284.

[15] A. Pronobis, "Semantic Mapping with Mobile Robots," dissertation, KTH Royal Institute of Technology, 2011.

[16] J. Stückler, B. Waldvogel, H. Schulz, and S. Behnke, "Dense real-time mapping of object-class semantics from RGB-D video," *Journal of Real-Time Image Processing*, pp. 1-11, 2013.

[17] V. Vineet, O. Miksik, M. Lidegaard, M. Niesner, S. Golodetz, V. A. Prisacariu, O. Kähler, D. W. Murray, S. Izadi, P. Perez, and P. H. S. Torr, "Incremental dense semantic stereo fusion for large-scale semantic scene reconstruction," in *IEEE International Conference on Robotics and Automation (ICRA)*, 2015.

[18] B. Leibe, N. Cornelis, K. Cornelis, and L. Van Gool, "Dynamic 3d scene analysis from a moving vehicle," in *IEEE Conf. on Computer Vision and Pattern Recognition (CVPR)*, June 2007, pp. 1-8.

[19] S. Pillai and J. Leonard, "Monocular slam supported object recognition," in *Proceedings of Robotics: Science and Systems (RSS)*, Rome, Italy, July 2015.

[20] N. Atanasov, M. Zhu, K. Daniilidis, and G. Pappas, "Semantic Localization Via the Matrix Permanent," in *Robotics: Science and Systems (RSS)*, 2014.

[21] S. Bao and S. Savarese, "Semantic Structure from Motion," in *IEEE Conf. on Computer Vision and Pattern Recognition (CVPR)*, 2011, pp. 2025-2032.

[22] R. Salas-Moreno, R. Newcombe, H. Strasdat, P. Kelly, and A. Davison, "SLAM++: Simultaneous Localisation and Mapping at the Level of Objects," in *IEEE Conf. on Computer Vision and Pattern Recognition (CVPR)*, 2013, pp. 1352-1359.

[23] D. Gálvez-López, M. Salas, J. Tardós, and J. Montiel, "Real-time Monocular Object SLAM," arXiv: 1504.02398, 2015.

[24] I. Reid, "Towards Semantic Visual SLAM," in *Int. Conf. on Control Automation Robotics Vision (ICARCV)*, 2014.

[25] A. Kundu, Y. Li, F. Dellaert, F. Li, and J. Rehg, "Joint semantic segmentation and 3d reconstruction from monocular video," in *Computer Vision ECCV 2014*, ser. Lecture Notes in Computer Science, D. Fleet, T. Pajdla, B. Schiele, and T. Tuytelaars, Eds. Springer International Publishing, 2014, vol. 8694, pp. 703-718. [Online]. Available: http://dx.doi.org/10.1007/978-3-319-10599-445

[26] I. Kostavelis and A. Gasteratos, "Semantic mapping for mobile robotics tasks: A survey," *Robotics and Autonomous Systems*, vol. 66, pp. 86-103, 2015.

[27] J. Neira and J. Tardós, "Data Association in Stochastic Mapping Using the Joint Compatibility Test," *IEEE Trans. on Robotics and Automation (TRO)*, vol. 17, no. 6, pp. 890-897, 2001.

[28] J. Munkres, "Algorithms for the Assignment and Transportation Problems," *Journal of the Society for Industrial & Applied Mathematics (SIAM)*, vol. 5, no. 1, pp. 32-38, 1957.

[29] N. Atanasov, M. Zhu, K. Daniilidis, and G. Pappas, "Localization from semantic observations via the matrix permanent," *The International Journal of Robotics Research*, vol. 35, no. 1-3, pp. 73-99, 2016.

[30] A. Mourikis and S. I. Roumeliotis, "A multi-state constraint kalman filter for vision-aided inertial navigation," in *Robotics and Automation, 2007 IEEE International Conference on. IEEE*, 2007, pp. 3565-3572.

[31] M. Bloesch, S. Oman, M. Nutter, and R. Siegwart, "Robust visual inertial odometry using a direct ekf-based approach," in *IEEE/RSJ Int. Conf. on Intelligent Robots and Systems (IROS)*, 2015, pp. 298-304.

[32] C. Forster, M. Pizzoli, and D. Scaramuzza, "Svo: Fast semi-direct monocular visual odometry," in *IEEE Int. Conf. on Robotics and Automation (ICRA)*, 2014, pp. 15-22.

[33] E. Rublee, V. Rabaud, K. Konolige, and G. Bradski, "Orb: An efficient alternative to sift or surf," in *Int. Conf. on Computer Vision*, 2011, pp. 2564-2571.

[34] S. Gidaris and N. Komodakis, "Object detection via a multi-region and semantic segmentation-aware cnn model," in *IEEE Int. Conf. on Computer Vision*, 2015, pp. 1134-1142.

[35] K. He, X. Zhang, S. Ren, and J. Sun, "Deep residual learning for image recognition," arXiv preprint arXiv:1512.03385, 2015.

[36] Z. Cai, Q. Fan, R. Feris, and N. Vasconcelos, "A unified multi-scale deep convolutional neural network for fast object detection," in *European Conference on Computer Vision (ECCV)*, 2016.

[37] M. Zhu, N. Atanasov, G. Pappas, and K. Daniilidis, "Active Deformable Part Models Inference," in *European Conference on Computer Vision (ECCV)*, ser. Lecture Notes in Computer Science. Springer, 2014, vol. 8695, pp. 281-296.

[38] C. Dubout and F. Fleuret, "Deformable part models with individual part scaling," in *British Machine Vision Conference*, no. EPFL-CONF-192393, 2013.

[39] F. Dellaert, "Factor graphs and gtsam: A hands-on introduction," GT RIM, Tech. Rep. GT-RIM-CP&R-2012-002, September 2012. [Online]. Available: https://research.cc.gatech.edu/borg/sites/edu.borg/files/downloads/gtsam.pdf

[40] C. Forster, L. Carlone, F. Dellaert, and D. Scaramuzza, "Imu preintegration on manifold for efficient visual-inertial maximum-a-posteriori estimation," in *Proceedings of Robotics: Science and Systems*, Rome, Italy, July 2015.

[41] D. G. Kottas, K. Wu, and S. I. Roumeliotis, "Detecting and dealing with hovering maneuvers in vision-aided inertial navigation systems," in *2013 IEEE/RSJ International Conference on Intelligent Robots and Systems*, November 2013, pp. 3172-3179.

[42] J. Nikolic, J. Rehder, M. Burn, P. Gohl, S. Leutenegger, P. T. Furgale, and R. Siegwart, "A synchronized visual-inertial sensor system with fpga pre-processing for accurate real-time slam," in *Robotics and Automation (ICRA), 2014 IEEE International Conference on. IEEE*, 2014, pp. 431-437.

[43] A. Geiger, P. Lenz, and R. Urtasun, "Are we ready for autonomous driving? the kitti vision benchmark suite," in *Conference on Computer Vision and Pattern Recognition (CVPR)*, 2012.

[44] R. Mur-Artal, J. M. M. Montiel, and J. D. Tardós, "ORB-SLAM: a versatile and accurate monocular SLAM system," *IEEE Transactions on Robotics*, vol. 31, no. 5, pp. 1147-1163, 2015.

[45] R. Mur-Artal and J. D. Tardós, "ORB-SLAM2: an open-source SLAM system for monocular, stereo and RGB-D cameras," *CoRR*, vol. abs/1610.06475, 2016. [Online]. Available: http://arxiv.org/abs/1610.06475

[46] A. Geiger, J. Ziegler, and C. Stiller, "StereoScan: Dense 3d Reconstruction in Real-time," in *Intelligent Vehicles Symposium (IV)*, 2011, pp. 963-968.

Probabilistic Data Association for Semantic SLAM—Section II

I. Probabilistic Data Association in SLAM

Consider the classical localization and mapping problem, in which a mobile sensor moves through an unknown environment, modeled as a collection $\mathcal{L} \triangleq \{\ell_m\}_{m=1}^M$ of M static landmarks. Given a set of sensor measurements $\mathcal{Z} \triangleq \{z_k\}_{k=1}^K$, the task is to estimate the landmark positions $\mathcal{L}$ and a sequence of poses $X \triangleq \{x_t\}_{t=1}^T$ representing the sensor trajectory. Most existing work focuses on estimating X and $\mathcal{L}$ and rarely emphasizes that the data association $\mathcal{D} \triangleq \{(\alpha_k, \beta_k)\}_{i=1}^K$ stipulating that measurement $Z_k$ of landmark $\ell_{\beta_k}$ was obtained from sensor state $x_{\alpha_k}$ is in fact unknown. A complete statement of the SLAM problem involves maximum likelihood estimation of X, $\mathcal{L}$ and $\mathcal{D}$ given the measurements $\mathcal{Z}$:

$$\hat{X}, \hat{\mathcal{L}}, \hat{\mathcal{D}} = \arg\max_{X, \mathcal{L}, \mathcal{D}} \log p(\mathcal{Z} \mid X, \mathcal{L}, \mathcal{D}) \quad (1)$$

The most common approach to this maximization has been to decompose it into two separate estimation problems. First, given prior estimates $X^0$ and $\mathcal{L}^0$, the maximum likelihood estimate $\hat{\mathcal{D}}$ of the data association $\mathcal{D}$ is computed (e.g., via JCBB [1] or the Hungarian algorithm [2]). Then, given $\hat{\mathcal{D}}$, the most likely landmark and sensor states are estimated $$\hat{\mathcal{D}} = \arg\max_{\mathcal{D}} p(\mathcal{D} \mid X^0, \mathcal{L}^0, \mathcal{Z}) \quad (2)$$

$$\hat{X}, \hat{\mathcal{L}} = \arg\max_{X, \mathcal{L}} \log p(\mathcal{Z} \mid X, \mathcal{L}, \hat{\mathcal{D}})$$

The second optimization above is typically carried out via filtering [4]-[6] or pose-graph optimization [7], [8].

The above process has the disadvantage that an incorrectly chosen data association may have a highly detrimental effect on the estimation performance. Moreover, if ambiguous measurements are discarded to avoid incorrect association choices, they will never be reconsidered later when refined estimates of the sensor pose (and hence their data association) are available. Instead of a simple one step process, then, it is possible to perform coordinate descent, which iterates the two maximization steps as follows:

$$\mathcal{D}^{i+1} = \arg\max_{\mathcal{D}} p(\mathcal{D} | \mathcal{X}^i, \mathcal{L}^i, \mathcal{Z}) \quad (3)$$

$$\mathcal{X}^{i+1}, \mathcal{L}^{i+1} = \arg\max_{\mathcal{X},\mathcal{L}} \log p(\mathcal{Z} | \mathcal{X}, \mathcal{L}, \mathcal{D}^{i+1})$$

This resolves the problem of being able to revisit association decisions once state estimates improve but does little to resolve the problem with ambiguous measurements since a hard decision on data associations is still required. To address this, rather than simply selecting $\mathcal{D}$ as the mode p($\mathcal{D}$ |X, $\mathcal{L}$, $\mathcal{Z}$), we should consider the entire density of $\mathcal{D}$ when estimating X and $\mathcal{L}$. Given initial estimates $\mathcal{X}^i$, $\mathcal{L}^i$, an improved estimate that utilizes the whole density of $\mathcal{D}$ can be computed by maximizing the expected measurement likelihood via expectation maximization (EM):

$$\mathcal{X}^{i+1}, \mathcal{L}^{i+1} = \arg\max_{\mathcal{X},\mathcal{L}} \mathbb{E}_{\mathcal{D}}[\log p(\mathcal{Z}|\mathcal{X},\mathcal{L},\mathcal{D})|\mathcal{X}^i,\mathcal{L}^i,\mathcal{Z}] \quad (4)$$

$$= \arg\max_{\mathcal{X},\mathcal{L}} \sum_{\mathcal{D}\in I} p(\mathcal{D}|\mathcal{X}^i,\mathcal{L}^i,\mathcal{Z}) \log p(\mathcal{Z}|\mathcal{X},\mathcal{L},\mathcal{D})$$

where $\mathbb{D}$ is the space of all possible values of $\mathcal{D}$. This EM formulation has the advantage that no hard decisions on data association are required since it probabilistically "averages" over all possible associations. To compare this with the coordinate descent formulation in (3), we can rewrite (4). We use the assumption here that data associations are independent across time steps, i.e. p($\mathcal{D}$ |$\mathcal{Z}$, X, $\mathcal{L}$)=$\Pi_{t=1}^T$p($\mathcal{D}_t|\mathcal{Z}_t$, X, $\mathcal{L}$) Furthermore, let $\mathcal{Z}_t = \{z_k^t\}_{k=1}^{K_t} \subseteq \mathcal{Z}$ be the set of measurements received at time t.

$$\arg\max_{\mathcal{X},\mathcal{L}} \sum_{t=1}^{T} \sum_{\mathcal{D}_t \in I_t} \sum_{k=1}^{K_t} p(\mathcal{D}_t|\mathcal{X}^i,\mathcal{L}^i,\mathcal{Z}_t) \log p(z_k|x_t, \ell_{\beta_k}) = \quad (5)$$

$$\arg\max_{\mathcal{X},\mathcal{L}} \sum_{t=1}^{T} \sum_{k=1}^{K_t} \sum_{j=1}^{M} w_{kj}^{t,i} \log p(z_k^t|x_t, \ell_j)$$

where $$w_{kj}^{t,i} \triangleq \sum_{\mathcal{D}_t \in I_t(k,j)} p(\mathcal{D}_t|\mathcal{X}^i,\mathcal{L}^i,\mathcal{Z}_t) \quad (6)$$

a weight, independent of the optimization variables X and $\mathcal{L}$, that quantifies the influence of the "soft" data association, $\mathbb{D}_t \subseteq \mathbb{D}$ is the set of all possible data associations for measurements received at time t, and $\mathbb{D}_t(k, j) \triangleq \{\mathcal{D}_t \in \mathbb{D}_t | \beta_k = j\} \subseteq \mathbb{D}_t$ is the set of all data associations such that measurement k is assigned to landmark j. Note that the coordinate descent optimization (3) has a similar form to (8), except that for each k there is exactly one j such that $w_{kj}^i=1$ and $w_{kl}^i=0$ for all $l \neq j$.

Because of the combinatorial size of the data association space $\mathbb{D}$, for a large number of measurements $\mathcal{Z}$ the weights $w_{kj}^{t,i}$ can become intractible to compute. It is possible, however, to express this quantity as a matrix permanent.

Proposition 1. Optimization (4) can be solved iteratively as follows:

$$w_{kj}^{t,i} = \gamma_t^i l_{kj}^t \text{ per } L_{-kj}^t \quad (8)$$

$$\mathcal{X}^{i+1}, \mathcal{L}^{i+1} = \arg\max_{\mathcal{X},\mathcal{L}} \sum_{t=1}^{T} \sum_{k=1}^{K_t} \sum_{j=1}^{M} w_{kj}^{t,i} \log p(z_k^t|x_t, \ell_j)$$

where $\gamma_t^i$ is a normalizing factor such that $\Sigma_k w_{kj}^{t,i}=1$, per denotes the matrix permanent, $L^t$ is the matrix of individual measurement likelihoods with $l_{ij}^t=p(z_i^t|x_t, \ell_j)$ and $L_{-ij}^t$ the matrix $L^t$ with the ith row and jth column removed.
Proof. See Appendix A.

Crucially, the above proposition allows us to take advantage of matrix permanent approximation algorithms [9], [10] that have been developed. Proposition 1 thus allows us to effectively summarize the combinatorially large data association space in polynomial time, making probabilistic data association feasible for even a large number of measurements.

Similar to the coordinate descent formulation, the EM formulation (8) allows us to solve the permanent maximization problem iteratively. First, instead of estimating a maximum likelihood data association, we estimate the data association distribution p($\mathcal{D}$ |$\mathcal{X}^i$, $\mathcal{L}^i$, $\mathcal{Z}$) in the form of the weights $w_{kj}^i$ (the "E" step). Then, we maximize the expected measurement log likelihood over the previously computed distribution (the "M" step).

While this approach allows us to include measurements of landmarks in the map without computing an explicit data association, the question of how to include initialization of new landmarks remains. Past approaches make a hard decision based on e.g. the Mahalanobis distance between the measurement and the expected measurement from all known landmarks. If the smallest such distance is above a threshold, a new landmark is initialized, and the optimization proceeds as described above.

The "soft" data association formulated above, however, is generalizable to richer data association spaces and models, including that of new landmark initialization. Previously, we had considered the data association space $\mathbb{D}$ as the set of one-to-one mappings from the measurements {1, 2, . . . , |$\mathcal{Z}$|} onto known landmarks {1, . . . , M}. Here, we expand the codomain of functions in $\mathbb{D}$ from {1, . . . , M}. We now let a measurement $z_k$ map to an existing landmark in {1, . . . , M}, or to a special "new" association $n_k$ corresponding to measurement k being of a previously unseen landmark.

Let $S_d(t)$ be the set of landmarks that generated a measurement at time t, the "detected" set, and let $S_n(t)$ be the set of landmarks that were newly observed at time t. Let $p_{tj}$ be the probability that a given landmark $\ell_j$ is detected from sensor state $x_t$. For a fixed x,$\ell$, we assume that the probability that $\ell$ is detected from x is given by a known function $p_D(x, \ell)$. As our estimates are uncertain, however, we must take this into account in the computation of $p_{tj}$:

$$p_{tj} = \int_x \int_\ell p_D(x,\ell) p(x,\ell) d\ell \, dx \quad (9)$$

In practice, this quantity can be estimated accurately via Monte Carlo integration with relatively few samples by drawing from the joint estimated distribution p(x, $\ell$):

$$\hat{p}_{tj} = \frac{1}{N} \sum_{i=1}^{N} p_D(x_i, \ell_i) \quad (10)$$

where $(x_i, \ell_i)_{i=1}^N$ are N i.i.d. samples drawn from current estimated distribution of x, $\ell$ p(x, $\ell$).

As in [11], we model the "birth" of new landmarks at time step t as a Poisson random finite set $S_n(t)$. The cardinality of $S_n(t)$ and hence the number of new landmarks observed at any time step t is thus Poisson distributed with mean $\lambda_n$. For a new landmark $\ell \in S_n(t)$ that generates measurement z, we assume that the measurement z is spatially distributed with distribution $p_{new}(z)$ which can be taken to be e.g. uniform over the measurement space.

Let $\ell_{n_k}$ be a possibly-existing landmark that is newly initialized from measurement k. To simplify notation and exposition, we let $\ell_{M+1} = \ell_{n_1}$, $\ell_{M+2} = \ell_{n_2}$, ..., $\ell_{M+K} = \ell_{n_K}$. We then have the following result.

Proposition 2. Optimization (4) under the expanded data association space can be solved as follows:

$$w_{kj}^i = \gamma_t^i q_{kj}^t \text{ per } Q_{-kj}^t \quad (12)$$

$$X^{i+1}, \mathcal{L}^{i+1} = \arg\max_{X, \mathcal{L}} \sum_{t=1}^T \sum_{k=1}^{K_t} \sum_{j=1}^{M+K_t} w_{kj}^{t,i} \log p(z_k^t | x_t, \ell_j)$$

where $\gamma_t^i$ is a normalizing factor such that $\Sigma_k w_{kj}^i = 1$.

$$Q^t = [G^t H^t] \quad (13)$$

$G^t \in \mathbb{R}^{K_t \times |M_d(t)|}$ is a matrix of scaled measurement likelihoods with $$g_{kj}^t = \frac{p_{tj}}{\lambda_n(1 - p_{tj})} p(z_k | x_t, \ell_j) \quad (14)$$

$H^t \in \mathbb{R}^{K_t \times K_t}$ is a diagonal matrix of birthed landmark likelihoods:

$$H \triangleq \text{diag}([p_{new}(z_1) \ldots p_{new}(z_K)]) \quad (15)$$

and $Q_{-kj}$ is the matrix Q with the kth row and jth column removed.

Proof. See Appendix B

Intuitively, this approach can be viewed as follows. For each measurement $z_k$, a new landmark $\ell_{n_k}$ is initialized from the measurement. The data association distribution weights w are then computed over both landmarks previously in the map $\ell_j$ and the newly initialized landmarks $\ell_{n_k}$ while accounting for the probabilities of detecting known landmarks and of observing new ones.

Appendix A
Proof of Proposition 1

The weights $w_{kj}^{t,i}$ are defined as (see (6))

$$w_{kj}^{t,i} \triangleq \sum_{\mathcal{D}_t \in I_t(k,j)} p(\mathcal{D}_t | X^i, \mathcal{L}^i, \mathcal{Z}_t). \quad (16)$$

We can write an individual data association probability as $$p(\mathcal{D} | X, \mathcal{L}, \mathcal{Z}) = \frac{p(\mathcal{Z} | X, \mathcal{L}, \mathcal{D}) p(\mathcal{D} | X, \mathcal{L})}{p(\mathcal{Z} | X, \mathcal{L})} \quad (18)$$

$$= \frac{p(\mathcal{Z} | X, \mathcal{L}, \mathcal{D}) p(\mathcal{D} | X, \mathcal{L})}{\sum_{\mathcal{D}'} p(\mathcal{Z} | X, \mathcal{L}, \mathcal{D}') p(\mathcal{D}' | X, \mathcal{L})}$$

Assuming that the likelihood of any given data association not given any measurements, $p(\mathcal{D} | X, \mathcal{L})$ is uniform, let γ be a constant proportionality factor $$\gamma_t^i \triangleq \frac{1}{\sum_{\mathcal{D}_t'} p(\mathcal{Z}_t | X^i, \mathcal{L}^i, \mathcal{D}_t')} \quad (19)$$

so that $$w_{kj}^{t,i} = \gamma_t^i \sum_{\mathcal{D}_t \in \mathbb{D}_t(k,j)} p(\mathcal{Z}_t | X, \mathcal{L}, \mathcal{D}_t). \quad (20)$$

Now, given a data association, individual measurements are independent and so we can expand $$w_{kj}^{t,i} = \gamma_t^i \sum_{\mathcal{D}_t \in \mathbb{D}_t(k,j)} \prod_{s=1}^{K_t} p(z_s^t | x_t, \ell_{\beta_s}) \quad (21)$$

For all $\mathcal{D}_t \in \mathbb{D}_t(k, j)$ we have $\beta_k = j$ by definition, so $$w_{kj}^{t,i} = \gamma_t^i p(z_k^t | x_t, \ell_j) \sum_{\mathcal{D}_t \in \mathbb{D}_t(k,j)} \prod_{s \neq k} p(z_s^t | x_t, \ell_{\beta_s}) \quad (22)$$

From the definition of the matrix permanent, $$\text{per } L = \sum_{\pi} \prod_{s=1}^{K_t} l_{s, \pi(s)} \quad (23)$$

where the first sum is over all one-to-one functions $\pi$: $\{1, \ldots, K_t\} \to \{1, \ldots, M\}$. This is exactly our definition of a valid data association, so $$\text{per } L = \sum_{\mathcal{D} \in \mathbb{D}} \prod_{s=1}^{K_t} l_{s, \beta_s} \quad (24)$$

$$= \sum_{\mathcal{D} \in \mathbb{D}} \prod_{s=1}^{K_t} p(z_s^t | x_t, \ell_{\beta_s}) \quad (25)$$

Similarly, the permanent of $L_{-kj}^t$ will include a sum over all one-to-one functions $\pi$: $\{1, \ldots, K_t\} \setminus \{k\} \to \{1, \ldots, M\} \setminus \{j\}$. It is now easy to see that $$\text{per } L_{-kj}^t = \sum_{\mathcal{D}_t \in \mathbb{D}_t(k,j)} \prod_{s \neq k} p(z_s^t | x_t, \ell_{\beta_s}) \quad (26)$$

and so we have the final expression $$w_{kj}^{t,i} = \gamma_t^i p(z_k^t | x_t, \ell_j) \text{per } L_{-kj}^t \quad (28)$$

$$= \gamma_t^i l_{kj}^t \text{ per } L_{-kj}^t$$

Appendix B
Proof of Proposition 2

First, note that equations (8), (6) still hold under the expanded data association definition. We can expand the likelihood for a single data association $p(\mathcal{D}_t | X, \mathcal{L}, \mathcal{Z})$ as $$p(\mathcal{D}\mid X, \mathcal{L}, \mathcal{Z}) = \frac{p(\mathcal{Z}\mid X, \mathcal{L}, \mathcal{D})p(\mathcal{D}\mid X, \mathcal{L})}{p(\mathcal{Z}\mid X, \mathcal{L})} \quad (29)$$

Let $\mathcal{A}(\mathcal{D})$ be the event that the received measurements $\mathcal{Z}$ are assigned to the set of detected landmarks $S_d(t)$ in the way specified by the data association $\mathcal{D}$. We can decompose the probability $p(\mathcal{D}\mid X, \mathcal{L})$ as follows:

$$p(\mathcal{D}\mid X, \mathcal{L}) = P(\ell \in S_d(t) \text{ are detected}) \times \quad (30)$$
$$P(\ell \in \ell_{1:M}\setminus S_d(t) \text{ are missed}) \times P(\ell \in S_d(t) \text{ are new}) \times P(\mathcal{A}(\mathcal{D}))$$

With our assumed detection model, the first term can be computed as $$P(\ell \in S_d(t) \text{ are detected}) = \prod_{\ell \in S_d(t)} p_D(x_t, \ell) \quad (31)$$

The second term is similarly computed as $$P(\ell \in \ell_{1:M}\setminus S_d \text{ are missed}) = \prod_{\ell \in \ell_{1:M}\setminus S_d} (1 - p_D(x, \ell)) \quad (32)$$

The third term follows from the assumption that newly detected landmarks follow a Poisson random finite set:

$$P(\ell \in S_d(t) \text{ are new}) = \frac{e^{-\lambda_n}\lambda_n^n}{n!}, \quad (33)$$

where $n=|S_n(t)|$.

The last term is simply uniform over the space of possible assignments, or $$P(\mathcal{A}(\mathcal{D})) = \frac{1}{K_t P_d} \quad (34)$$
$$= \frac{(K_t - d)!}{K_t!} \quad (35)$$

where $d = |S_d(t)|$.

Combining these, $$p(\mathcal{D}\mid X, \mathcal{L}) = \frac{\lambda_n^n e^{-\lambda_n}}{K_t!}\prod_{\ell \in \ell_{1:M}}(1 - p_D(x_t, \ell))\prod_{\ell \in S_d(t)}\frac{p_D(x_t, \ell)}{1 - p_D(x_t, \ell)} \quad (36)$$

Next, given a particular data association $\mathcal{D}$, individual measurements are independent, and so we expand the measurement likelihoods $p(\mathcal{Z}\mid X, \mathcal{L}, \mathcal{D})$. Letting $z(\ell)$ be the measurement assigned to landmark $\ell$ under $\mathcal{D}$, $$p(\mathcal{Z}\mid X, \mathcal{L}, \mathcal{D}) = \prod_k p(z_k \mid x, \ell_{\beta_k}) \quad (37)$$
$$= \prod_{\ell \in S_d} p(z(\ell)\mid x, \ell)\prod_{\ell \in S_n} p(z(\ell)\mid x, \ell) \quad (38)$$
$$= \prod_{\ell \in S_d} p(z(\ell)\mid x, \ell)\prod_{\ell \in S_n} p_{new}(z(\ell)) \quad (39)$$

The weights $w_{kj}$ can then be computed as $$w_{kj}^i \triangleq \sum_{\mathcal{D}\in D(k,j)} p(\mathcal{D}\mid X^i, \mathcal{L}^i, \mathcal{Z}) \quad (40)$$
$$= \sum_{\mathcal{D}\in D(k,j)} \frac{p(\mathcal{Z}, X, \mathcal{L}, \mathcal{D})p(\mathcal{D}\mid X, \mathcal{L})}{p(\mathcal{Z}\mid X, \mathcal{L})} \quad (41)$$
$$= \gamma_t \sum_{\mathcal{D}\in D(k,j)}\prod_{\ell \in S_d}\frac{p_D(x,\ell)p(z(\ell)\mid x,\ell)}{\lambda_n(1 - p_D(x,\ell))}\prod_{\ell \in S_n} p_{new}(z(\ell)) \quad (42)$$
$$= \gamma_t p(z_k\mid x, \ell_j)\sum_{\mathcal{D}\in D(k,j)}\prod_{\substack{\ell \in S_d\\ z(\ell)\neq z_k}}\frac{p_D(x,\ell)p(z(\ell)\mid x,\ell)}{\lambda_n(1 - p_D(x,\ell))}\prod_{\substack{\ell \in S_n\\ z(\ell)\neq z_k}} \quad (43)$$

where $$\gamma_t = \frac{\lambda_n^K e^{-\lambda_n}}{K!p(\mathcal{Z}\mid X, \mathcal{L})}\prod_{\ell\in\ell_{1:M}}(1 - p_D(x,\ell)) \quad (44)$$

is a normalizing factor independent of k, j, and any particular data association.

Let $G \in \mathbb{R}^{K\times d}$ be a matrix of scaled measurement likelihoods with entries $$g_{kj} \triangleq \frac{p_D(x, \ell_j)p(z_k\mid x, \ell_j)}{\lambda_n(1 - p_D(x, \ell_j))} \quad (45)$$

let $H \in \mathbb{R}^{K\times K}$ be a diagonal matrix of birthed landmark measurement probabilities, $$H \triangleq \text{diag}([p_{new}(z_1) \ldots p_{new}(z_K)]) \quad (46)$$

and let $Q \in \mathbb{R}^{K\times (d+K)}$ be given by the concatenation of G and H:

$$Q \triangleq [G\ H] \quad (47)$$

The permanent of Q is defined as $$\sum_\pi \prod_{s=1}^K q_{s,\pi(s)} \quad (48)$$

where the sum is over all one-to-one functions $\pi: \{1, \ldots, K\}\to\{1, \ldots, d, n_1, \ldots, n_K\}$. This function space exactly matches the space of valid data associations. Thus, the permanent of Q can be written as $$\text{per } Q = \sum_{\mathcal{D}\in D}\prod_{s=1}^K q_{s,\beta_s} \quad (49)$$
$$= \sum_{\mathcal{D}\in D}\prod_{s:\beta_s\leq K} q_{s,\beta_s}\prod_{s:\beta_s > K} q_{s,\beta_s} \quad (50)$$

$$= \sum_{\mathcal{D}\in\mathbb{D}} \prod_{\ell\in S_d} \frac{p_D(x, \ell_j)p(z(\ell)|x, \ell_j)}{\lambda_n(1 - p_D(x, \ell_j))} \prod_{\ell\in S_n} p_{new}(z(\ell)) \quad (51)$$

It is now easy to see that $$\text{per } Q_{-kj} = \sum_{\mathcal{D}\in\mathbb{D}(k,j)} \prod_{\substack{\ell\in S_d \\ z(\ell)\neq z_k}} \frac{p_D(x, \ell)p(z(\ell)|x, \ell)}{\lambda_n(1 - p_D(x, \ell))} \prod_{\substack{\ell\in S_n \\ z(\ell)\neq z_k}} p_{new}(z(\ell)) \quad (52)$$

and so we have that $$w_{kj}^i = \gamma q_{kj} \text{ per } Q_{-kj} \quad (53)$$

as desired.

REFERENCES

Each of the following references is hereby incorporated by reference in its entirety.

[1] J. Neira and J. Tardós, "Data Association in Stochastic Mapping Using the Joint Compatibility Test," *IEEE Trans. on Robotics and Automation (TRO)*, vol. 17, no. 6, pp. 890-897, 2001.
[2] J. Munkres, "Algorithms for the Assignment and Transportation Problems," *Journal of the Society for Industrial & Applied Mathematics (SIAM)*, vol. 5, no. 1, pp. 32-38, 1957.
[3] N. Atanasov, M. Zhu, K. Daniilidis, and G. Pappas, "Localization from semantic observations via the matrix permanent," *The International Journal of Robotics Research*, vol. 35, no. 1-3, pp. 73-99, 2016.
[4] A. Mourikis and S. Roumeliotis, "A multi-state constraint kalman filter for vision-aided inertial navigation," in *Robotics and Automation, 2007 IEEE International Conference on. IEEE*, 2007, pp. 3565-3572.
[5] M. Bloesch, S. Oman, M. Nutter, and R. Siegwart, "Robust visual inertial odometry using a direct ekf-based approach," in *IEEE/RSJ Int. Conf. on Intelligent Robots and Systems (IROS)*, 2015, pp. 298-304.
[6] C. Forster, M. Pizzoli, and D. Scaramuzza, "Svo: Fast semi-direct monocular visual odometry," in *IEEE Int. Conf. on Robotics and Automation (ICRA)*, 2014, pp. 15-22.
[7] M. Kaess, H. Johannsson, R. Roberts, V. Ila, J. Leonard, and F. Dellaert, "iSAM2: Incremental Smoothing and Mapping Using the Bayes Tree," *The International Journal of Robotics Research (IJRR)*, vol. 31, no. 2, pp. 216-235, 2012.
[8] R. Kümmerle, G. Grisetti, H. Strasdat, K. Konolige, and W. Burgard, "g2o: A General Framework for Graph Optimization," in *IEEE Int. Conf. on Robotics and Automation (ICRA)*, 2011, pp. 3607-3613.
[9] M. Jerrum, A. Sinclair, and E. Vigoda, "A polynomial-time approximation algorithm for the permanent of a matrix with nonnegative entries," *J. ACM*, vol. 51, no. 4, pp. 671-697, July 2004. [Online]. Available: http://doi.acm.org/10.1145/1008731.1008738
[10] W. J. Law, "Approximately counting perfect and general matchings in bipartite and general graphs," Ph.D. dissertation, Duke University, 2009.
[11] B. N. Vo and W. K. Ma, "The gaussian mixture probability hypothesis density filter," *IEEE Transactions on Signal Processing*, vol. 54, no. 11, pp. 4091-4104, November 2006.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A mobile robot comprising:
  a movement sensor;
  a camera; and
  at least one processor configured for:
    receiving a set of sensor measurements from the movement sensor and a set of images captured by the camera as the mobile robot traverses an environment;
    for each image of at least a subset of the set of images, extracting a plurality of detected objects from the image; and
    estimating a trajectory of the mobile robot and a respective semantic label and position of each detected object within the environment using the sensor measurements and an expectation maximization (EM) algorithm;
  wherein using the EM algorithm comprises iteratively solving for a data association distribution for a plurality of data associations between the detected objects and the semantic labels and positions of the detected objects using a matrix permanent algorithm in an expectation step of the EM algorithm.

2. The mobile robot of claim 1, wherein using the EM algorithm comprises iteratively solving for respective mobile robot positions and semantic labels and positions of detected objects using the data association distribution in a maximization step of the EM algorithm.

3. The mobile robot of claim 2, wherein using the EM algorithm comprises iterating between the expectation step and the maximization step until an end condition is reached.

4. The mobile robot of claim 1, wherein estimating the trajectory of the mobile robot and the semantic label and position of each detected object comprises, for each image of the subset of the set of images, extracting a plurality of geometric point features.

5. The mobile robot of claim 4, comprising tracking the geometric point features across the set of images.

6. The mobile robot of claim 1, wherein estimating the trajectory of the mobile robot and the semantic label and position of each detected object comprises constructing a pose graph comprising a first plurality of vertices for a plurality of mobile robot poses and a second plurality of vertices for a plurality of detected object positions.

7. The mobile robot of claim 6, wherein estimating the trajectory of the mobile robot and the semantic label and position of each detected object comprises determining a plurality of soft data associations between mobile robot poses and detected object positions using, for each soft data association, a plurality of factors.

8. The mobile robot of claim 7, wherein the plurality of factors comprise semantic factors, geometric factors, and movement sensor factors.

9. The mobile robot of claim 1, wherein receiving the set of sensor measurements from the movement sensor comprises receiving accelerometer and gyroscope measurements from an inertial measurement unit of the mobile robot, and wherein receiving the set of sensor measurements and the set of images comprises time synchronizing the sensor measurements and the images.

\* \* \* \* \*